(12) United States Patent
Ishaya et al.

(10) Patent No.: US 9,544,289 B2
(45) Date of Patent: Jan. 10, 2017

(54) METHOD AND SYSTEM FOR IDENTITY-BASED AUTHENTICATION OF VIRTUAL MACHINES

(71) Applicant: Rackspace US, Inc., San Antonio, TX (US)

(72) Inventors: Vishvananda Ishaya, San Francisco, CA (US); Erik Carlin, San Antonio, TX (US); Paul Voccio, Windcrest, TX (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

(21) Appl. No.: 14/691,218

(22) Filed: Apr. 20, 2015

(65) Prior Publication Data
US 2015/0229629 A1 Aug. 13, 2015

Related U.S. Application Data

(63) Continuation of application No. 13/829,781, filed on Mar. 14, 2013, now Pat. No. 9,027,087.

(51) Int. Cl.
| H04L 29/06 | (2006.01) |
| G06F 9/455 | (2006.01) |
| G06F 9/46 | (2006.01) |
| G06F 9/50 | (2006.01) |
| H04L 29/08 | (2006.01) |

(52) U.S. Cl.
CPC .......... *H04L 63/08* (2013.01); *G06F 9/45558* (2013.01); *G06F 9/468* (2013.01); *G06F 9/5072* (2013.01); *H04L 63/0876* (2013.01); *H04L 63/10* (2013.01); *H04L 63/101* (2013.01); *H04L 67/10* (2013.01)

(58) Field of Classification Search
CPC .......................... G06F 9/45558; H04L 63/08
USPC ........................................................... 726/4
See application file for complete search history.

(56) References Cited

U.S. PATENT DOCUMENTS

| 8,838,764 B1* | 9/2014 | Johnston ............. H04L 41/0866 709/223 |
| 2003/0200247 A1 | 10/2003 | Banzhaf et al. |
| 2005/0268336 A1* | 12/2005 | Finnegan ................ G06F 21/31 726/15 |
| 2008/0005798 A1 | 1/2008 | Ross |
| 2011/0090911 A1 | 4/2011 | Hao et al. |
| 2012/0054486 A1 | 3/2012 | Lakkavalli et al. |
| 2012/0096149 A1 | 4/2012 | Sunkara et al. |

* cited by examiner

Primary Examiner — Jacob Lipman
(74) Attorney, Agent, or Firm — Haynes and Boone, LLP

(57) ABSTRACT

A cloud computing system configured to run virtual machine instances is disclosed. The cloud computing system assigns an identity to each virtual machine instance. When the virtual machine instance accesses initial configuration resources, it provides this identity to the resources to authenticate itself. This allows for flexible and extensible initial configuration of virtual machine instances.

20 Claims, 10 Drawing Sheets

METHOD AND SYSTEM FOR IDENTITY-BASED AUTHENTICATION OF VIRTUAL MACHINES

CROSS REFERENCE TO RELATED APPLICATIONS

The present application is a continuation of U.S. application Ser. No. 13/829,781, filed Mar. 14, 2013, which is incorporated herein in its entirety by reference.

BACKGROUND

The present disclosure relates generally to cloud computing, and more particularly to using identity information for authentication of virtual machines.

Cloud computing services can provide computational capacity, data access, networking/routing and storage services via a large pool of shared resources operated by a cloud computing provider. Because the computing resources are delivered over a network, cloud computing is location-independent computing, with all resources being provided to end-users on demand with control of the physical resources separated from control of the computing resources.

Originally the term cloud came from a diagram that contained a cloud-like shape to contain the services that afforded computing power that was harnessed to get work done. Much like the electrical power we receive each day, cloud computing is a model for enabling access to a shared collection of computing resources—networks for transfer, servers for storage, and applications or services for completing work. More specifically, the term "cloud computing" describes a consumption and delivery model for IT services based on the Internet, and it typically involves over-the-Internet provisioning of dynamically scalable and often virtualized resources. This frequently takes the form of web-based tools or applications that users can access and use through a web browser as if it was a program installed locally on their own computer. Details are abstracted from consumers, who no longer have need for expertise in, or control over, the technology infrastructure "in the cloud" that supports them. Most cloud computing infrastructures consist of services delivered through common centers and built on servers. Clouds often appear as single points of access for consumers' computing needs, and do not require end-user knowledge of the physical location and configuration of the system that delivers the services.

The utility model of cloud computing is useful because many of the computers in place in data centers today are underutilized in computing power and networking bandwidth. People may briefly need a large amount of computing capacity to complete a computation for example, but may not need the computing power once the computation is done. The cloud computing utility model provides computing resources on an on-demand basis with the flexibility to bring it up or down through automation or with little intervention.

As a result of the utility model of cloud computing, there are a number of aspects of cloud-based systems that can present challenges to existing application infrastructure. First, clouds should enable self-service, so that users can provision servers and networks with little human intervention. Second, network access is necessary. Because computational resources are delivered over the network, the individual service endpoints need to be network-addressable over standard protocols and through standardized mechanisms. Third, multi-tenancy. Clouds are designed to serve multiple consumers according to demand, and it is important that resources be shared fairly and that individual users not suffer performance degradation. Fourth, elasticity. Clouds are designed for rapid creation and destruction of computing resources, typically based upon virtual containers. Provisioning these different types of resources must be rapid and scale up or down based on need. Further, the cloud itself as well as applications that use cloud computing resources must be prepared for impermanent, fungible resources; application or cloud state must be explicitly managed because there is no guaranteed permanence of the infrastructure. Fifth, clouds typically provide metered or measured service—like utilities that are paid for by the hour, clouds should optimize resource use and control it for the level of service or type of servers such as storage or processing.

Cloud computing offers different service models depending on the capabilities a consumer may require, including SaaS, PaaS, and IaaS-style clouds. SaaS (Software as a Service) clouds provide the users the ability to use software over the network and on a distributed basis. SaaS clouds typically do not expose any of the underlying cloud infrastructure to the user. PaaS (Platform as a Service) clouds provide users the ability to deploy applications through a programming language or tools supported by the cloud platform provider. Users interact with the cloud through standardized APIs, but the actual cloud mechanisms are abstracted away. Finally, IaaS (Infrastructure as a Service) clouds provide computer resources that mimic physical resources, such as computer instances, network connections, and storage devices. The actual scaling of the instances may be hidden from the developer, but users are required to control the scaling infrastructure.

One way in which different cloud computing systems may differ from each other is in how they deal with control of the underlying hardware and privacy of data. The different approaches are sometimes referred to a "public clouds," "private clouds," "hybrid clouds," and "multi-vendor clouds." A public cloud has an infrastructure that is available to the general public or a large industry group and is likely owned by a cloud services company. A private cloud operates for a single organization, but can be managed on-premise or off-premise. A hybrid cloud can be a deployment model, as a composition of both public and private clouds, or a hybrid model for cloud computing may involve both virtual and physical servers. A multi-vendor cloud is a hybrid cloud that may involve multiple public clouds, multiple private clouds, or some mixture.

Cloud computing systems include virtual machines that are instantiated from virtual machine images. One problem faced in cloud computing systems is handling security for newly instantiated virtual machine instances. The obvious solution to this problem is to store authentication information (e.g., ssh keys, login credentials, etc) directly in the virtual machine image. This would allow a virtual machine image to be authenticated immediately following instantiation. However, this type of authentication, based on the virtual machine instance's "possession" of a security credential, is inherently insecure; as the virtual machine images may be under the control of a party other than the one that created the image (e.g. the cloud services provider). So embedding login credentials in the image is not a practical solution. Another solution is the concept of administrative volumes, which are read-only information sources mounted automatically by new virtual machines. A newly instantiated virtual machine can read these volumes to obtain its initial configuration. However, read-only volumes are insufficient to provide all information needed by the newly instantiated virtual machine. For example, some virtual machines need information about the current state of the network upon instantiation. Storing this information in an administrative volume would require that volume to be constantly updated as network conditions changed, leading to the possibility of the virtual machine receiving stale data.

Accordingly, a system and method to authenticate newly instantiated virtual machine instances based on their identity would be desirable. Such a solution provides an appropriate level of security and a higher degree of flexibility to react to existing conditions in a cloud computing system.

SUMMARY OF THE INVENTION

In one embodiment, a cloud computing system includes a resource having configuration information. The system further includes a virtual machine instance operably coupled to the resource, wherein the virtual machine instance has an identity. The system further includes an authentication manager configured to control access by the virtual machine instance to the resource based on the identity of the virtual machine instance.

In another embodiment, a method for controlling access to a resource includes instantiating a virtual machine instance. The method further includes assigning an identity to the virtual machine instance. The method further includes receiving a request for access to the resource from the virtual machine instance, the request including the identity of the virtual machine instance. The method further includes determining whether the virtual machine instance may access the resource based on the identity in the request.

In another embodiment, a method for controlling access of virtual machines to resources in a cloud computing system includes receiving a request to instantiate a virtual machine instance. The method further includes instantiating the virtual machine instance. The method further includes assigning the virtual machine instance a unique, immutable attribute. The method further includes performing an initial boot of the virtual machine instance. The method further includes receiving a request from the virtual machine instance to access a resource, the request including the unique, immutable attribute. The method further includes determining whether to allow or deny the request from the virtual machine instance to access the resource based on permissions configured for the unique, immutable attribute assigned to the virtual machine instance. If it is determined that the request should be allowed, the method further includes transmitting a response to the virtual machine instance. If it is determined that the request should not be allowed, the method further includes transmitting an error response to the virtual machine instance.

DETAILED DESCRIPTION

The following disclosure has reference to computing services delivered on top of a cloud architecture.

Figure 1:
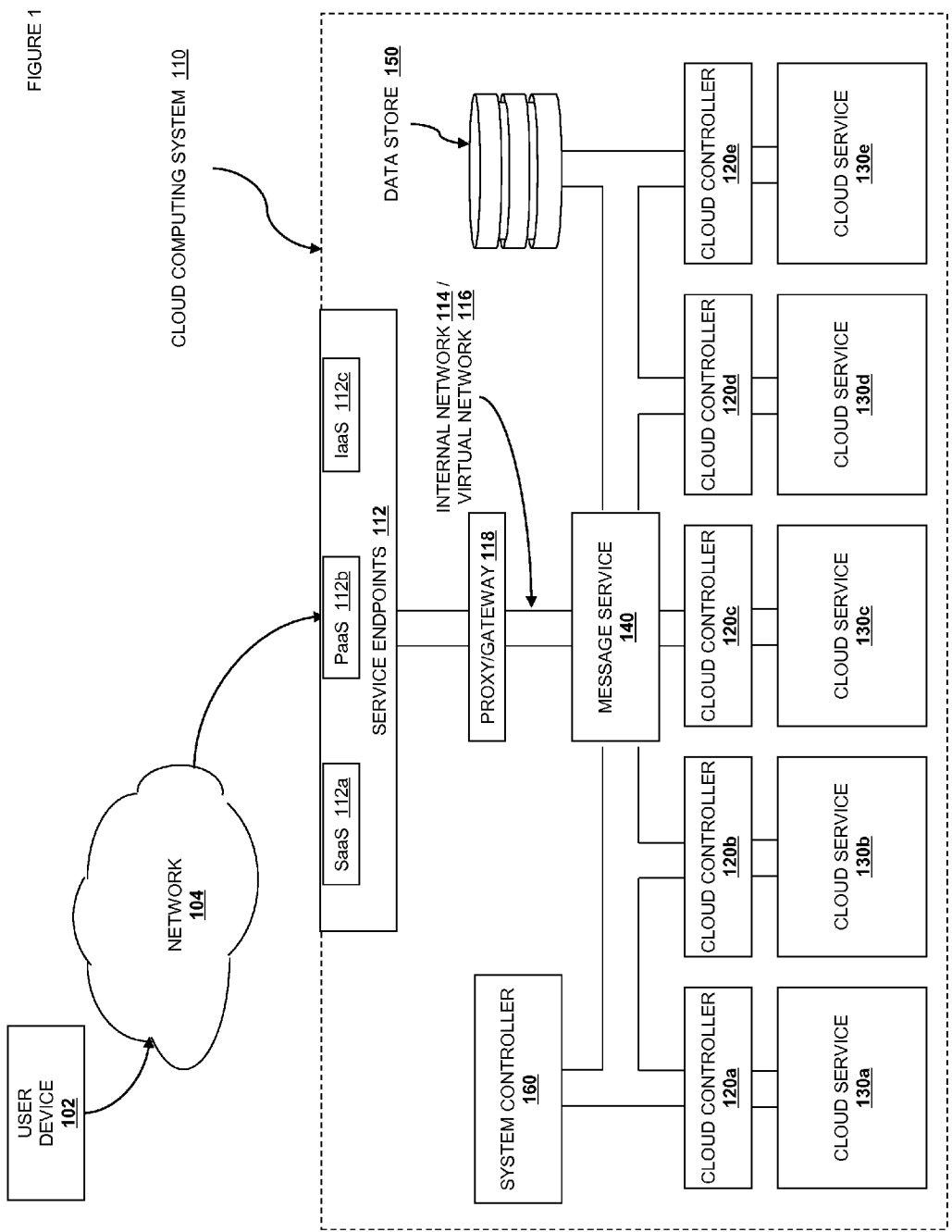
FIG. 1 is a schematic view illustrating an external view of a cloud computing system.

Referring now to FIG. 1, an external view of one embodiment of a cloud computing system 110 is illustrated. The cloud computing system 110 includes a user device 102 connected to a network 104 such as, for example, a Transport Control Protocol/Internet Protocol (TCP/IP) network (e.g., the Internet.) The user device 102 is coupled to the cloud computing system 110 via one or more service endpoints 112. Depending on the type of cloud service provided, these endpoints give varying amounts of control relative to the provisioning of resources within the cloud computing system 110. For example, SaaS endpoint 112a will typically only give information and access relative to the application running on the cloud storage system, and the scaling and processing aspects of the cloud computing system will be obscured from the user. PaaS endpoint 112b will typically give an abstract Application Programming Interface (API) that allows developers to declaratively request or command the backend storage, computation, and scaling resources provided by the cloud, without giving exact control to the user. IaaS endpoint 112c will typically provide the ability to directly request the provisioning of resources, such as computation units (typically virtual machines), software-defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions. This allows the cloud computing system 110 to be used for new, user-defined services without requiring specific support.

It is important to recognize that the control allowed via an IaaS endpoint is not complete. Within the cloud computing system 110 are one or more cloud controllers 120 (running what is sometimes called a "cloud operating system") that work on an even lower level, interacting with physical machines, managing the contradictory demands of the multi-tenant cloud computing system 110. The workings of the cloud controllers 120 are typically not exposed outside of the cloud computing system 110, even in an IaaS context. In one embodiment, the commands received through one of the service endpoints 112 are then routed via one or more internal networks 114. The internal network 114 couples the different services to each other. The internal network 114 may encompass various protocols or services, including but not limited to electrical, optical, or wireless connections at the physical layer; Ethernet, Fibre channel, ATM, and SONET at the MAC layer; TCP, UDP, ZeroMQ or other services at the connection layer; and XMPP, HTTP, AMPQ, STOMP, SMS, SMTP, SNMP, or other standards at the protocol layer. The internal network 114 is typically not exposed outside the cloud computing system, except to the extent that one or more virtual networks 116 may be exposed that control the internal routing according to various rules. The virtual networks 116 typically do not expose as much complexity as may exist in the actual internal network 114; but varying levels of granularity can be exposed to the control of the user, particularly in IaaS services.

In one or more embodiments, it may be useful to include various processing or routing nodes in the network layers 114 and 116, such as proxy/gateway 118. Other types of processing or routing nodes may include switches, routers, switch fabrics, caches, format modifiers, or correlators. These processing and routing nodes may or may not be visible to the outside. It is typical that one level of processing or routing nodes may be internal only, coupled to the internal network 114, whereas other types of network services may be defined by or accessible to users, and show up in one or more virtual networks 116. Either of the internal network 114 or the virtual networks 116 may be encrypted or authenticated according to the protocols and services described below.

In various embodiments, one or more parts of the cloud computing system 110 may be disposed on a single host. Accordingly, some of the "network" layers 114 and 116 may be composed of an internal call graph, inter-process communication (IPC), or a shared memory communication system.

Once a communication passes from the endpoints via a network layer 114 or 116, as well as possibly via one or more switches or processing devices 118, it is received by one or more applicable cloud controllers 120. The cloud controllers 120 are responsible for interpreting the message and coordinating the performance of the necessary corresponding services, returning a response if necessary. Although the cloud controllers 120 may provide services directly, more typically the cloud controllers 120 are in operative contact with the service resources 130 necessary to provide the corresponding services. For example, it is possible for different services to be provided at different levels of abstraction. For example, a "compute" service 130a may work at an IaaS level, allowing the creation and control of user-defined virtual computing resources. In the same cloud computing system 110, a PaaS-level object storage service 130b may provide a declarative storage API, and a SaaS-level Queue service 130c, DNS service 130d, or Database service 130e may provide application services without exposing any of the underlying scaling or computational resources. Other services are contemplated as discussed in detail below.

In various embodiments, various cloud computing services or the cloud computing system itself may require a message passing system. The message routing service 140 is available to address this need, but it is not a required part of the system architecture in at least one embodiment. In one embodiment, the message routing service is used to transfer messages from one component to another without explicitly linking the state of the two components. Note that this message routing service 140 may or may not be available for user-addressable systems; in one preferred embodiment, there is a separation between storage for cloud service state and for user data, including user service state.

In various embodiments, various cloud computing services or the cloud computing system itself may require a persistent storage for system state. The data store 150 is available to address this need, but it is not a required part of the system architecture in at least one embodiment. In one embodiment, various aspects of system state are saved in redundant databases on various hosts or as special files in an object storage service. In a second embodiment, a relational database service is used to store system state. In a third embodiment, a column, graph, or document-oriented database is used. Note that this persistent storage may or may not be available for user-addressable systems; in one preferred embodiment, there is a separation between storage for cloud service state and for user data, including user service state.

In various embodiments, it may be useful for the cloud computing system 110 to have a system controller 160. In one embodiment, the system controller 160 is similar to the cloud computing controllers 120, except that it is used to control or direct operations at the level of the cloud computing system 110 rather than at the level of an individual service.

For clarity of discussion above, only one user device 102 has been illustrated as connected to the cloud computing system 110, and the discussion generally referred to receiving a communication from outside the cloud computing system, routing it to a cloud controller 120, and coordinating processing of the message via a service 130, the infrastructure described is also equally available for sending out messages. These messages may be sent out as replies to previous communications, or they may be internally sourced. Routing messages from a particular service 130 to a user device 102 is accomplished in the same manner as receiving a message from user device 102 to a service 130, just in reverse. The precise manner of receiving, processing, responding, and sending messages is described below with reference to the various discussed service embodiments. One of skill in the art will recognize, however, that a plurality of user devices 102 may, and typically will, be connected to the cloud computing system 110 and that each element or set of elements within the cloud computing system is replicable as necessary. Further, the cloud computing system 110, whether or not it has one endpoint or multiple endpoints, is expected to encompass embodiments including public clouds, private clouds, hybrid clouds, and multi-vendor clouds.

Figure 2:
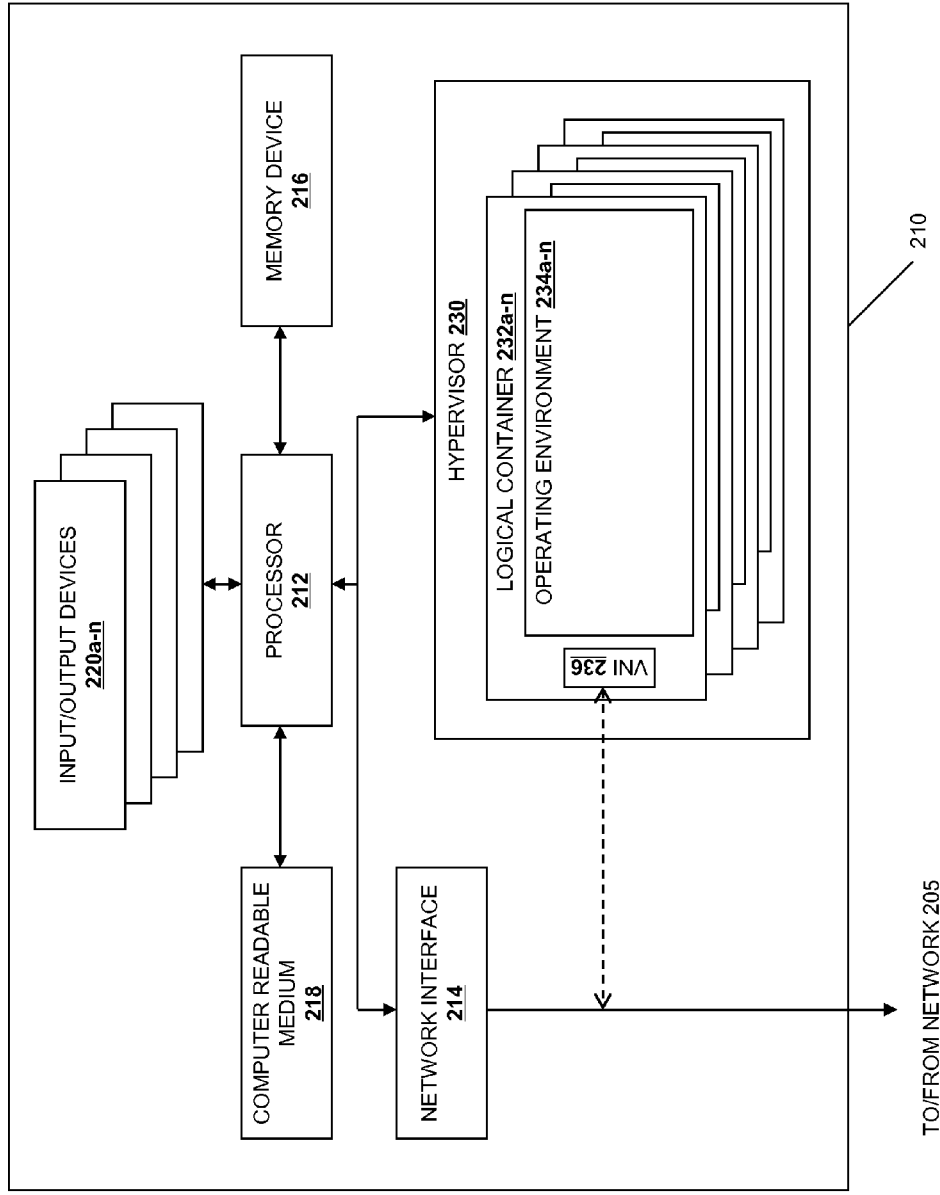
FIG. 2 is a schematic view illustrating an information processing system as used in various embodiments.

Each of the user device 102, the cloud computing system 110, the endpoints 112, the network switches and processing nodes 118, the cloud controllers 120 and the cloud services 130 typically include a respective information processing system, a subsystem, or a part of a subsystem for executing processes and performing operations (e.g., processing or communicating information). An information processing system is an electronic device capable of processing, executing or otherwise handling information, such as a computer. FIG. 2 shows an information processing system 210 that is representative of one of, or a portion of, the information processing systems described above.

Referring now to FIG. 2, diagram 200 shows an information processing system 210 configured to host one or more virtual machines, coupled to a network 205. The network 205 could be one or both of the networks 114 and 116 described above. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 210 shown is representative of, one of, or a portion of, the information processing systems described above.

The information processing system 210 may include any or all of the following: (a) a processor 212 for executing and otherwise processing instructions, (b) one or more network interfaces 214 (e.g., circuitry) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below.

In one embodiment, there is more than one network interface 214, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 210 may include a plurality of input/output devices 220a-n which is operably coupled to the processor 212, for inputting or outputting information, such as a display device 220a, a print device 220b, or other electronic circuitry 220c-n for performing other operations of the information processing system 210 known in the art.

With reference to the computer-readable media, including both memory device 216 and secondary computer-readable medium 218, the computer-readable media and the processor 212 are structurally and functionally interrelated with one another as described below in further detail, and information processing system of the illustrative embodiment is structurally and functionally interrelated with a respective computer-readable medium similar to the manner in which the processor 212 is structurally and functionally interrelated with the computer-readable media 216 and 218. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 200). Such interrelationships permit the data structures' functionality to be realized. For example, in one embodiment the processor 212 reads (e.g., accesses or copies) such functional descriptive material from the network interface 214, the computer-readable media 218 onto the memory device 216 of the information processing system 210, and the information processing system 210 (more particularly, the processor 212) performs its operations, as described elsewhere herein, in response to such material stored in the memory device of the information processing system 210. In addition to reading such functional descriptive material from the computer-readable medium 218, the processor 212 is capable of reading such functional descriptive material from (or through) the network 105. In one embodiment, the information processing system 210 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 210, without limiting them to a specific location or implementation.

The information processing system 210 includes a hypervisor 230. The hypervisor 230 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 218. The hypervisor may be included logically "below" a host operating system, as a host itself, as part of a larger host operating system, or as a program or process running "above" or "on top of" a host operating system. Examples of hypervisors include Xen-server, KVM, VMware, Microsoft's Hyper-V, and emulation programs such as QEMU.

The hypervisor 230 includes the functionality to add, remove, and modify a number of logical containers 232a-n associated with the hypervisor. Zero, one, or many of the logical containers 232a-n contain associated operating environments 234a-n. The logical containers 232a-n can implement various interfaces depending upon the desired characteristics of the operating environment. In one embodiment, a logical container 232 implements a hardware-like interface, such that the associated operating environment 234 appears to be running on or within an information processing system such as the information processing system 210. For example, one embodiment of a logical container 234 could implement an interface resembling an x86, x86-64, ARM, or other computer instruction set with appropriate RAM, busses, disks, and network devices. A corresponding operating environment 234 for this embodiment could be an operating system such as Microsoft Windows, Linux, Linux-Android, or Mac OS X. In another embodiment, a logical container 232 implements an operating system-like interface, such that the associated operating environment 234 appears to be running on or within an operating system. For example one embodiment of this type of logical container 232 could appear to be a Microsoft Windows, Linux, or Mac OS X operating system. Another possible operating system includes an Android operating system, which includes significant runtime functionality on top of a lower-level kernel. A corresponding operating environment 234 could enforce separation between users and processes such that each process or group of processes appeared to have sole access to the resources of the operating system. In a third environment, a logical container 232 implements a software-defined interface, such a language runtime or logical process that the associated operating environment 234 can use to run and interact with its environment. For example one embodiment of this type of logical container 232 could appear to be a Java, Dalvik, Lua, Python, or other language virtual machine. A corresponding operating environment 234 would use the built-in threading, processing, and code loading capabilities to load and run code. Adding, removing, or modifying a logical container 232 may or may not also involve adding, removing, or modifying an associated operating environment 234. For ease of explanation below, these operating environments will be described in terms of an embodiment as "Virtual Machines," or "VMs," but this is simply one implementation among the options listed above.

In one or more embodiments, a VM has one or more virtual network interfaces 236. How the virtual network interface is exposed to the operating environment depends upon the implementation of the operating environment. In an operating environment that mimics a hardware computer, the virtual network interface 236 appears as one or more virtual network interface cards. In an operating environment that appears as an operating system, the virtual network interface 236 appears as a virtual character device or socket. In an operating environment that appears as a language runtime, the virtual network interface appears as a socket, queue, message service, or other appropriate construct. The virtual network interfaces (VNIs) 236 may be associated with a virtual switch (Vswitch) at either the hypervisor or container level. The VNI 236 logically couples the operating environment 234 to the network, and allows the VMs to send and receive network traffic. In one embodiment, the physical network interface card 214 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

Figure 3:
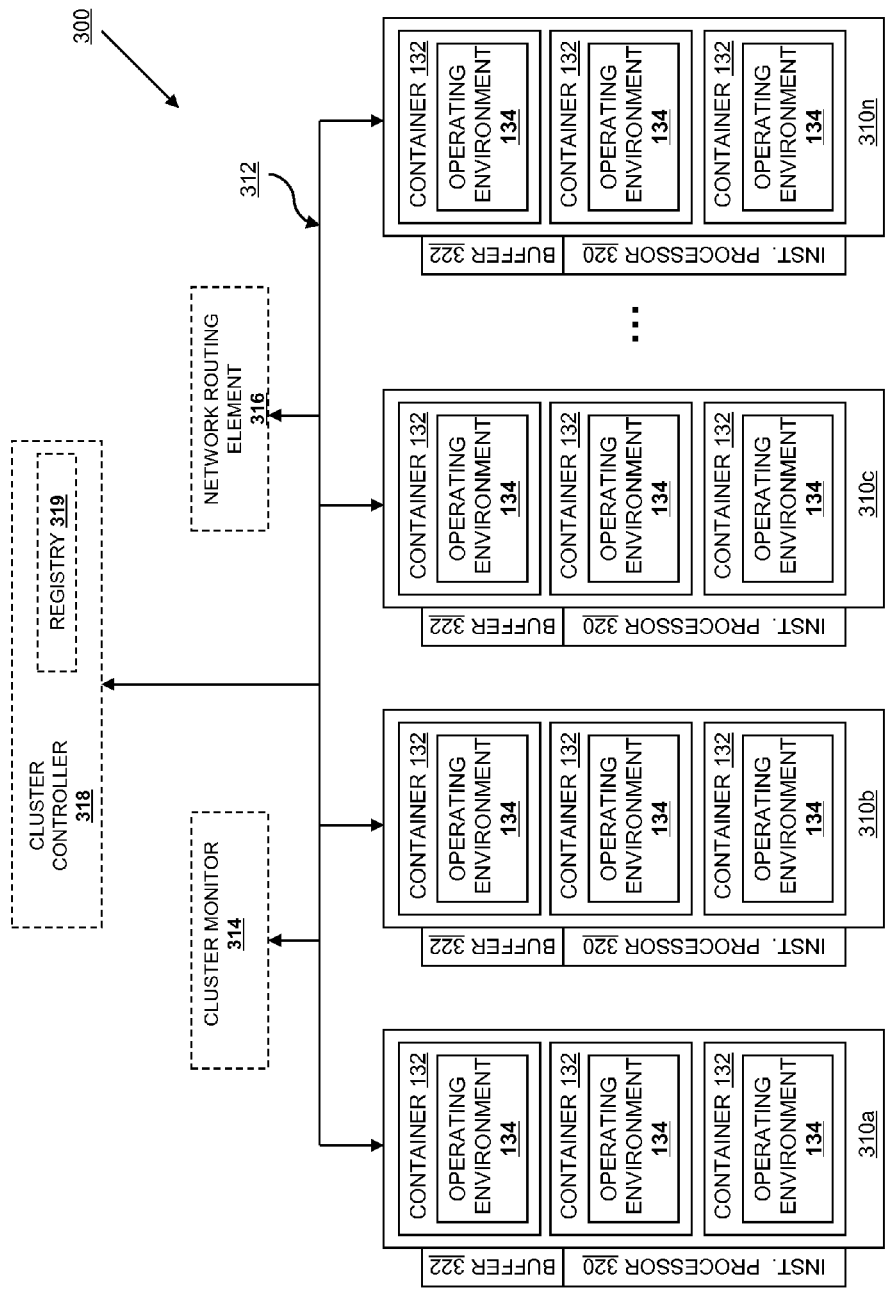
FIG. 3 is a virtual machine management system as used in various embodiments.

Turning now to FIG. 3, a simple network operating environment 300 for a cloud controller or cloud service is shown. The network operating environment 300 includes multiple information processing systems 310a-n, each of which correspond to a single information processing system 210 as described relative to FIG. 2, including a hypervisor 230, zero or more logical containers 232 and zero or more operating environments 234. The information processing systems 310a-n are connected via a communication medium 312, typically implemented using a known network protocol such as Ethernet, Fibre Channel, Infiniband, or IEEE 1394. For ease of explanation, the network operating environment 300 will be referred to as a "cluster," "group," or "zone" of operating environments. The cluster may also include a cluster monitor 314 and a network routing element 316. The cluster monitor 314 and network routing element 316 may be implemented as hardware, as software running on hardware, or may be implemented completely as software. In one implementation, one or both of the cluster monitor 314 or network routing element 316 is implemented in a logical container 232 using an operating environment 234 as described above. In another embodiment, one or both of the cluster monitor 314 or network routing element 316 is implemented so that the cluster corresponds to a group of physically co-located information processing systems, such as in a rack, row, or group of physical machines.

The cluster monitor 314 provides an interface to the cluster in general, and provides a single point of contact allowing someone outside the system to query and control any one of the information processing systems 310, the logical containers 232 and the operating environments 234. In one embodiment, the cluster monitor also provides monitoring and reporting capabilities.

The network routing element 316 allows the information processing systems 310, the logical containers 232 and the operating environments 234 to be connected together in a network topology. The illustrated tree topology is only one possible topology; the information processing systems and operating environments can be logically arrayed in a ring, in a star, in a graph, or in multiple logical arrangements through the use of vLANs.

In one embodiment, the cluster also includes a cluster controller 318. The cluster controller is outside the cluster, and is used to store or provide identifying information associated with the different addressable elements in the cluster—specifically the cluster generally (addressable as the cluster monitor 314), the cluster network router (addressable as the network routing element 316), each information processing system 310, and with each information processing system the associated logical containers 232 and operating environments 234.

The cluster controller 318 is outside the cluster, and is used to store or provide identifying information associated with the different addressable elements in the cluster—specifically the cluster generally (addressable as the cluster monitor 314), the cluster network router (addressable as the network routing element 316), each information processing system 310, and with each information processing system the associated logical containers 232 and operating environments 234. In one embodiment, the cluster controller 318 includes a registry of VM information 319. In a second embodiment, the registry 319 is associated with but not included in the cluster controller 318.

In one embodiment, the cluster also includes one or more instruction processors 320. In the embodiment shown, the instruction processor is located in the hypervisor, but it is also contemplated to locate an instruction processor within an active VM or at a cluster level, for example in a piece of machinery associated with a rack or cluster. In one embodiment, the instruction processor 320 is implemented in a tailored electrical circuit or as software instructions to be used in conjunction with a physical or virtual processor to create a hardware-software combination that implements the specific functionality described herein. To the extent that one embodiment includes computer-executable instructions, those instructions may include software that is stored on a computer-readable medium. Further, one or more embodiments have associated with them a buffer 322. The buffer 322 can take the form of data structures, a memory, a computer-readable medium, or an off-script-processor facility. For example, one embodiment uses a language runtime as an instruction processor 320. The language runtime can be run directly on top of the hypervisor, as a process in an active operating environment, or can be run from a low-power embedded processor. In a second embodiment, the instruction processor 320 takes the form of a series of interoperating but discrete components, some or all of which may be implemented as software programs. For example, in this embodiment, an interoperating bash shell, gzip program, an rsync program, and a cryptographic accelerator chip are all components that may be used in an instruction processor 320. In another embodiment, the instruction processor 320 is a discrete component, using a small amount of flash and a low power processor, such as a low-power ARM processor. This hardware-based instruction processor can be embedded on a network interface card, built into the hardware of a rack, or provided as an add-on to the physical chips associated with an information processing system 310. It is expected that in many embodiments, the instruction processor 320 will have an integrated battery and will be able to spend an extended period of time without drawing current. Various embodiments also contemplate the use of an embedded Linux or Linux-Android environment.

Networking

Figure 4A:
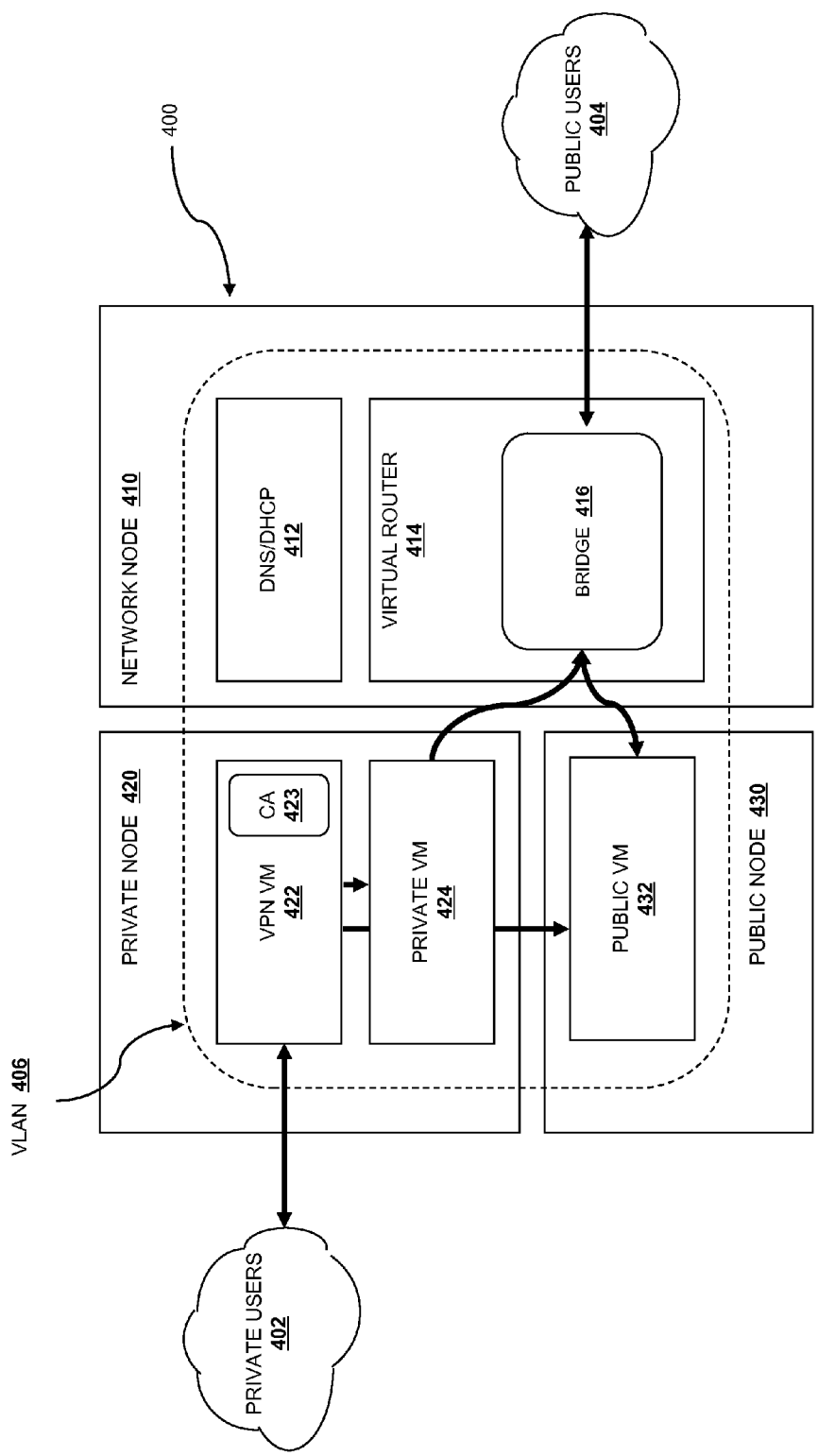
FIG. 4a is a diagram showing types of network access available to virtual machines in a cloud computing system according to various embodiments.

Referring now to FIG. 4a, a diagram of the network connections available to one embodiment of the system is shown. The network 400 is one embodiment of a virtual network 116 as discussed relative to FIG. 1, and is implemented on top of the internal network layer 114. A particular node is connected to the virtual network 400 through a virtual network interface 236 operating through physical network interface 214. The VLANs, VSwitches, VPNs, and other pieces of network hardware (real or virtual) are may be network routing elements 316 or may serve another function in the communications medium 312.

In one embodiment, the cloud computing system 110 uses both "fixed" IPs and "floating" IPs to address virtual machines. Fixed IPs are assigned to an instance on creation and stay the same until the instance is explicitly terminated. Floating IPs are IP addresses that can be dynamically associated with an instance. A floating IP address can be disassociated and associated with another instance at any time.

Different embodiments include various strategies for implementing and allocating fixed IPs, including "flat" mode, a "flat DHCP" mode, and a "VLAN DHCP" mode.

In one embodiment, fixed IP addresses are managed using a flat Mode. In this embodiment, an instance receives a fixed IP from a pool of available IP addresses. All instances are attached to the same bridge by default. Other networking configuration instructions are placed into the instance before it is booted or on boot.

In another embodiment, fixed IP addresses are managed using a flat DHCP mode. Flat DHCP mode is similar to the flat mode, in that all instances are attached to the same bridge. Instances will attempt to bridge using the default Ethernet device or socket. Instead of allocation from a fixed pool, a DHCP server listens on the bridge and instances receive their fixed IPs by doing a dhcpdiscover.

Turning now to a preferred embodiment using VLAN DHCP mode, there are two groups of off-local-network users, the private users 402 and the public internet users 404. To respond to communications from the private users 402 and the public users 404, the network 400 includes three nodes, network node 410, private node 420, and public node 430. The nodes include one or more virtual machines or virtual devices, such as DNS/DHCP server 412 and virtual router VM 414 on network node 410, VPN VM 422 and private VM 424 on private node 420, and public VM 432 on public node 430.

In one embodiment, VLAN DHCP mode requires a switch that supports host-managed VLAN tagging. In one embodiment, there is a VLAN 406 and bridge 416 for each project or group. In the illustrated embodiment, there is a VLAN associated with a particular project. The project receives a range of private IP addresses that are only accessible from inside the VLAN. and assigns an IP address from this range to private node 420, as well as to a VNI in the virtual devices in the VLAN. In one embodiment, DHCP server 412 is running on a VM that receives a static VLAN IP address at a known address, and virtual router VM 414, VPN VM 422, private VM 424, and public VM 432 all receive private IP addresses upon request to the DHCP server running on the DHCP server VM. In addition, the DHCP server provides a public IP address to the virtual router VM 414 and optionally to the public VM 432. In a second embodiment, the DHCP server 412 is running on or available from the virtual router VM 414, and the public IP address of the virtual router VM 414 is used as the DHCP address.

In an embodiment using VLAN DHCP mode, there is a private network segment for each project's or group's instances that can be accessed via a dedicated VPN connection from the Internet. As described below, each VLAN project or group gets its own VLAN, network bridge, and subnet. In one embodiment, subnets are specified by the network administrator, and assigned dynamically to a project or group when required. A DHCP Server is started for each VLAN to pass out IP addresses to VM instances from the assigned subnet. All instances belonging to the VLAN project or group are bridged into the same VLAN. In this fashion, network traffic between VM instances belonging to the same VLAN is always open but the system can enforce isolation of network traffic between different projects by enforcing one VLAN per project.

As shown in FIG. 4a, VLAN DHCP mode includes provisions for both private and public access. For private access (shown by the arrows to and from the private users cloud 402), users create an access keypair (as described further below) for access to the virtual private network through the gateway VPN VM 422. From the VPN VM 422, both the private VM 424 and the public VM 432 are accessible via the private IP addresses valid on the VLAN.

Public access is shown by the arrows to and from the public users cloud 404. Communications that come in from the public users cloud arrive at the virtual router VM 414 and are subject to network address translation (NAT) to access the public virtual machine via the bridge 416. Communications out from the private VM 424 are source NATted by the bridge 416 so that the external source appears to be the virtual router VM 414. If the public VM 432 does not have an externally routable address, communications out from the public VM 432 may be source NATted as well.

In one embodiment of VLAN DHCP mode, the second IP in each private network is reserved for the VPN VM instance 422. This gives a consistent IP to the instance so that forwarding rules can be more easily created. The network for each project is given a specific high-numbered port on the public IP of the network node 410. This port is automatically forwarded to the appropriate VPN port on the VPN VM 422.

In one embodiment, each group or project has its own certificate authority (CA) 423. The CA 423 is used to sign the certificate for the VPN VM 422, and is also passed to users on the private users cloud 402. When a certificate is revoked, a new Certificate Revocation List (CRL) is generated. The VPN VM 422 will block revoked users from connecting to the VPN if they attempt to connect using a revoked certificate.

In a project VLAN organized similarly to the embodiment described above, the project has an independent RFC 1918 IP space; public IP via NAT; has no default inbound network access without public NAT; has limited, controllable outbound network access; limited, controllable access to other project segments; and VPN access to instance and cloud APIs. Further, there is a DMZ segment for support services, allowing project metadata and reporting to be provided in a secure manner.

In one embodiment, VLANs are segregated using 802.1q VLAN tagging in the switching layer, but other tagging schemes such as 802.1ad, MPLS, or frame tagging are also contemplated. Network hosts create VLAN-specific interfaces and bridges as required.

In one embodiment, private VM 424 has per-VLAN interfaces and bridges created as required. These do not have IP addresses in the host to protect host access. Access is provided via routing table entries created per project and instance to protect against IP/MAC address spoofing and ARP poisoning.

Figure 4B:
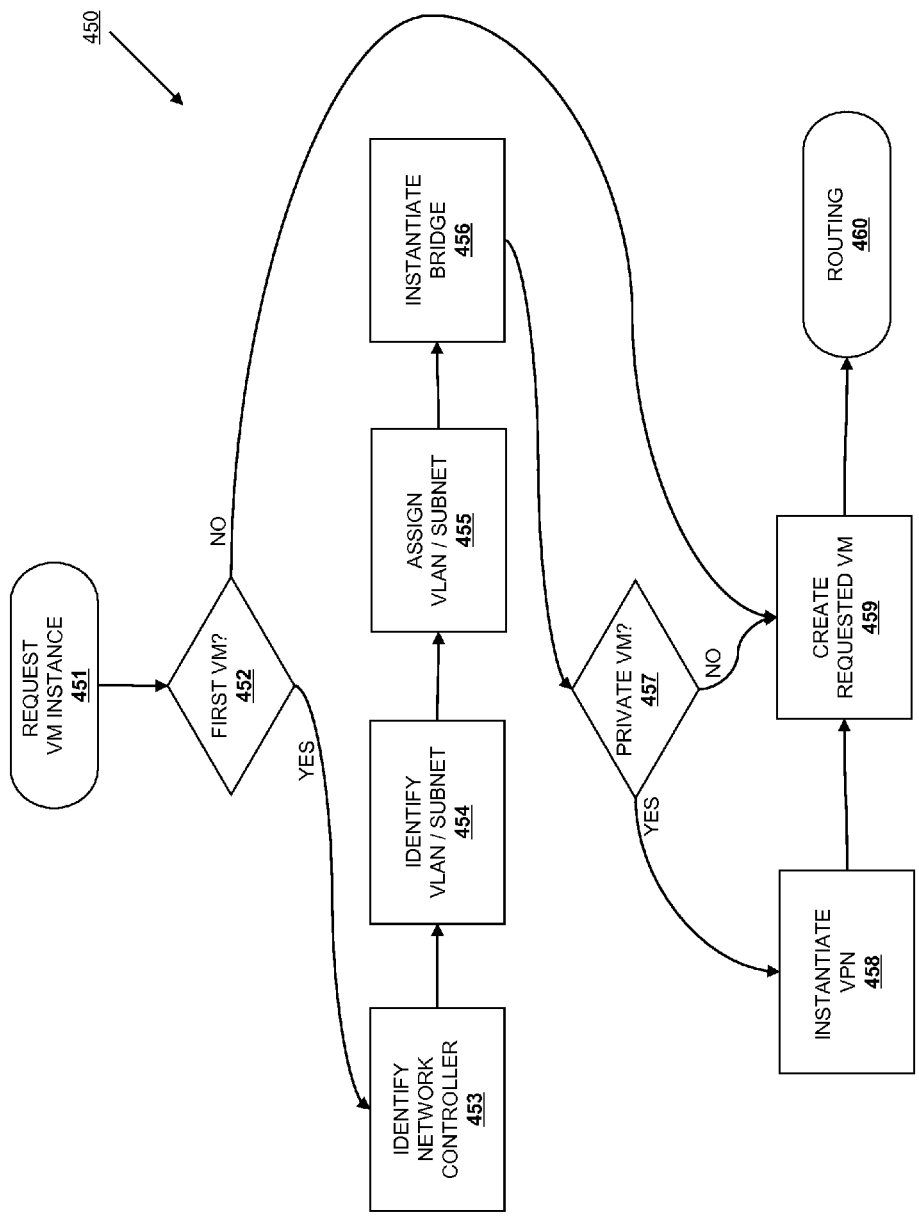
FIG. 4b is a flowchart showing the establishment of a VLAN for a project according to various embodiments.

FIG. 4b is a flowchart showing the establishment of a VLAN for a project according to one embodiment. The process 450 starts at step 451, when a VM instance for the project is requested. When running a VM instance, a user needs to specify a project for the instances, and the applicable security rules and security groups (as described herein) that the instance should join. At step 452, a cloud controller determines if this is the first instance to be created for the project. If this is the first, then the process proceeds to step 453. If the project already exists, then the process moves to step 459. At step 453, a network controller is identified to act as the network host for the project. This may involve creating a virtual network device and assigning it the role of network controller. In one embodiment, this is a virtual router VM 414. At step 454, an unused VLAN id and unused subnet are identified. At step 455, the VLAN id and subnet are assigned to the project. At step 456, DHCP server 412 and bridge 416 are instantiated and registered. At step 457, the VM instance request is examined to see if the request is for a private VM 424 or public VM 432. If the request is for a private VM, the process moves to step 458. Otherwise, the process moves to step 460. At step 458, the VPN VM 422 is instantiated and allocated the second IP in the assigned subnet. At step 459, the subnet and a VLAN have already been assigned to the project. Accordingly, the requested VM is created and assigned and assigned a private IP within the project's subnet. At step 460, the routing rules in bridge 416 are updated to properly NAT traffic to or from the requested VM.

Message Service

Between the various virtual machines and virtual devices, it may be necessary to have a reliable messaging infrastructure. In various embodiments, a message queuing service is used for both local and remote communication so that there is no requirement that any of the services exist on the same physical machine. Various existing messaging infrastructures are contemplated, including AMQP, ZeroMQ, STOMP and XMPP. Note that this messaging system may or may not be available for user-addressable systems; in one preferred embodiment, there is a separation between internal messaging services and any messaging services associated with user data.

In one embodiment, the message service sits between various components and allows them to communicate in a loosely coupled fashion. This can be accomplished using Remote Procedure Calls (RPC hereinafter) to communicate between components, built atop either direct messages and/ or an underlying publish/subscribe infrastructure. In a typical embodiment, it is expected that both direct and topic-based exchanges are used. This allows for decoupling of the components, full asynchronous communications, and transparent balancing between equivalent components. In some embodiments, calls between different APIs can be supported over the distributed system by providing an adapter class which takes care of marshalling and unmarshalling of messages into function calls.

In one embodiment, a cloud controller 120 (or the applicable cloud service 130) creates two queues at initialization time, one that accepts node-specific messages and another that accepts generic messages addressed to any node of a particular type. This allows both specific node control as well as orchestration of the cloud service without limiting the particular implementation of a node. In an embodiment in which these message queues are bridged to an API, the API can act as a consumer, server, or publisher.

Figure 5A:
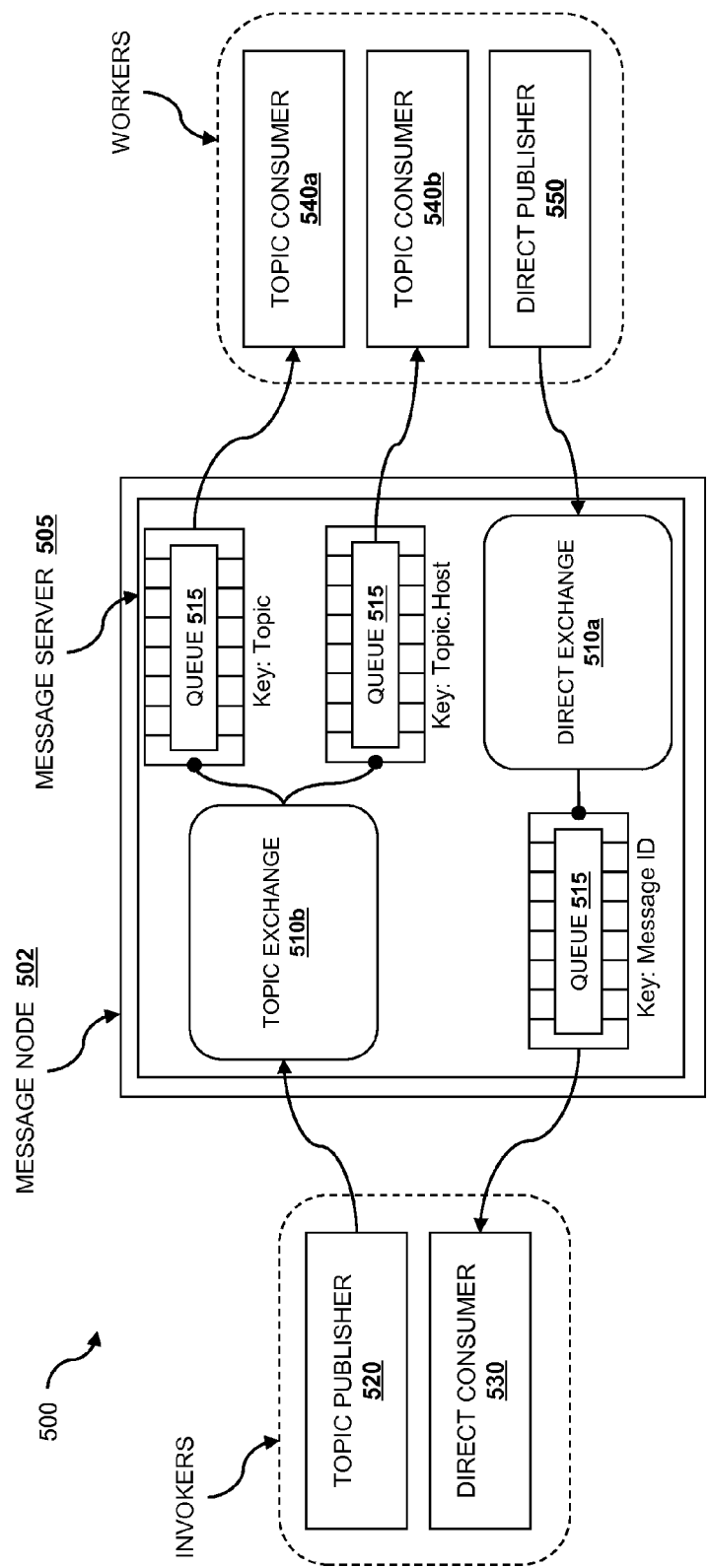
FIG. 5a shows a message service system according to various embodiments.

Turning now to FIG. 5a, one implementation of a message service 140 is shown at reference number 500. For simplicity of description, FIG. 5a shows the message service 500 when a single instance 502 is deployed and shared in the cloud computing system 110, but the message service 500 can be either centralized or fully distributed.

In one embodiment, the message service 500 keeps traffic associated with different queues or routing keys separate, so that disparate services can use the message service without interfering with each other. Accordingly, the message queue service may be used to communicate messages between network elements, between cloud services 130, between cloud controllers 120, between network elements, or between any group of sub-elements within the above. More than one message service 500 may be used, and a cloud service 130 may use its own message service as required.

For clarity of exposition, access to the message service 500 will be described in terms of "Invokers" and "Workers," but these labels are purely expository and are not intended to convey a limitation on purpose; in some embodiments, a single component (such as a VM) may act first as an Invoker, then as a Worker, the other way around, or simultaneously in each role. An Invoker is a component that sends messages in the system via two operations: 1) an RPC (Remote Procedure Call) directed message and ii) an RPC broadcast. A Worker is a component that receives messages from the message system and replies accordingly.

In one embodiment, there is a message server 505 including one or more exchanges 510. In a second embodiment, the message system is "brokerless," and one or more exchanges are located at each client. The exchanges 510 act as internal message routing elements so that components interacting with the message service 500 can send and receive messages. In one embodiment, these exchanges are subdivided further into a topic exchange 510a and a direct exchange 510b. An exchange 510 is a routing structure or system that exists in a particular context. In a currently preferred embodiment, multiple contexts can be included within a single message service with each one acting independently of the others. In one embodiment, the type of exchange, such as a topic exchange 510a vs. direct exchange 510b determines the routing policy. In a second embodiment, the routing policy is determined via a series of routing rules evaluated by the exchange 510.

The direct exchange 510a is a routing element created during or for RPC directed message operations. In one embodiment, there are many instances of a direct exchange 510a that are created as needed for the message service 500. In a further embodiment, there is one direct exchange 510a created for each RPC directed message received by the system.

The topic exchange 510a is a routing element created during or for RPC directed broadcast operations. In one simple embodiment, every message received by the topic exchange is received by every other connected component. In a second embodiment, the routing rule within a topic exchange is described as publish-subscribe, wherein different components can specify a discriminating function and only topics matching the discriminator are passed along. In one embodiment, there are many instances of a topic exchange 510b that are created as needed for the message service 500. In one embodiment, there is one topic-based exchange for every topic created in the cloud computing system. In a second embodiment, there are a set number of topics that have pre-created and persistent topic exchanges 510b.

Within one or more of the exchanges 510, it may be useful to have a queue element 515. A queue 515 is a message stream; messages sent into the stream are kept in the queue 515 until a consuming component connects to the queue and fetches the message. A queue 515 can be shared or can be exclusive. In one embodiment, queues with the same topic are shared amongst Workers subscribed to that topic.

In a typical embodiment, a queue 515 will implement a FIFO policy for messages and ensure that they are delivered in the same order that they are received. In other embodiments, however, a queue 515 may implement other policies, such as LIFO, a priority queue (highest-priority messages are delivered first), or age (oldest objects in the queue are delivered first), or other configurable delivery policies. In other embodiments, a queue 515 may or may not make any guarantees related to message delivery or message persistence.

In one embodiment, element 520 is a topic publisher. A topic publisher 520 is created, instantiated, or awakened when an RPC directed message or an RPC broadcast operation is executed; this object is instantiated and used to push a message to the message system. Every publisher connects always to the same topic-based exchange; its life-cycle is limited to the message delivery.

In one embodiment, element 530 is a direct consumer. A direct consumer 530 is created, instantiated, or awakened if an RPC directed message operation is executed; this component is instantiated and used to receive a response message from the queuing system. Every direct consumer 530 connects to a unique direct-based exchange via a unique exclusive queue, identified by a UUID or other unique name. The life-cycle of the direct consumer 530 is limited to the message delivery. In one embodiment, the exchange and queue identifiers are included the message sent by the topic publisher 520 for RPC directed message operations.

In one embodiment, elements 540 (elements 540a and 540b) are topic consumers. In one embodiment, a topic consumer 540 is created, instantiated, or awakened at system start. In a second embodiment, a topic consumer 540 is created, instantiated, or awakened when a topic is registered with the message system 500. In a third embodiment, a topic consumer 540 is created, instantiated, or awakened at the same time that a Worker or Workers are instantiated and persists as long as the associated Worker or Workers have not been destroyed. In this embodiment, the topic consumer 540 is used to receive messages from the queue and it invokes the appropriate action as defined by the Worker role. A topic consumer 540 connects to the topic-based exchange either via a shared queue or via a unique exclusive queue. In one embodiment, every Worker has two associated topic consumers 540, one that is addressed only during an RPC broadcast operations (and it connects to a shared queue whose exchange key is defined by the topic) and the other that is addressed only during an RPC directed message operations, connected to a unique queue whose with the exchange key is defined by the topic and the host.

In one embodiment, element 550 is a direct publisher. In one embodiment, a direct publisher 550 is created, instantiated, or awakened for RPC directed message operations and it is instantiated to return the message required by the request/response operation. The object connects to a direct-based exchange whose identity is dictated by the incoming message.

Figure 5B:
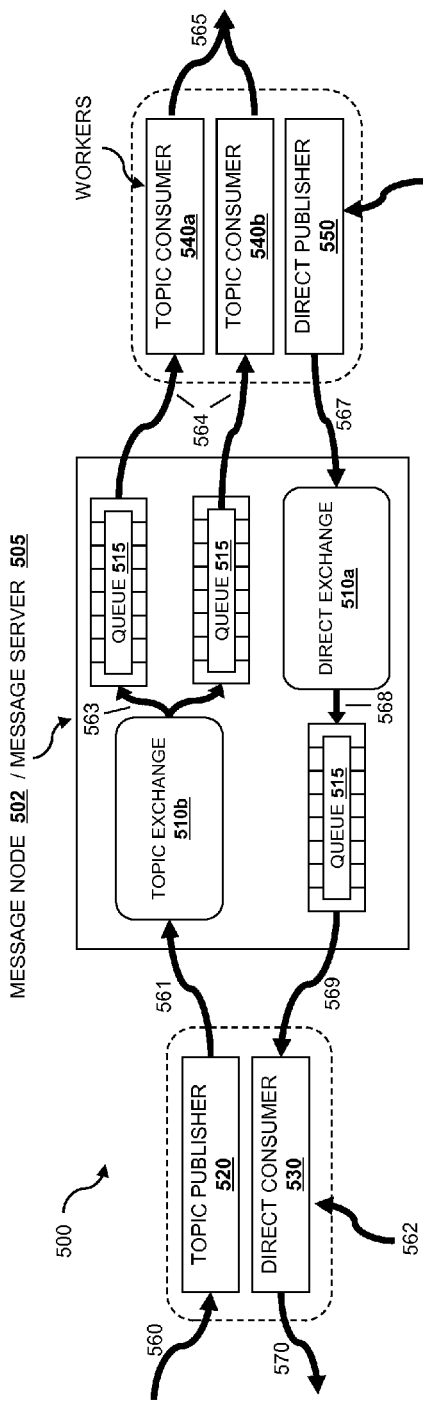
FIG. 5b is a diagram showing how a directed message is sent using the message service according to various embodiments.

Turning now to FIG. 5b, one embodiment of the process of sending an RPC directed message is shown relative to the elements of the message system 500 as described relative to FIG. 5a. All elements are as described above relative to FIG. 5a unless described otherwise. At step 560, a topic publisher 520 is instantiated. At step 561, the topic publisher 520 sends a message to an exchange 510b. At step 562, a direct consumer 530 is instantiated to wait for the response message. At step 563, the message is dispatched by the exchange 510b. At step 564, the message is fetched by the topic consumer 540 dictated by the routing key (either by topic or by topic and host). At step 565, the message is passed to a Worker associated with the topic consumer 540. If needed, at step 566, a direct publisher 550 is instantiated to send a response message via the message system 500. At step 567, the direct publisher 540 sends a message to an exchange 510a. At step 568, the response message is dispatched by the exchange 510a. At step 569, the response message is fetched by the direct consumer 530 instantiated to receive the response and dictated by the routing key. At step 570, the message response is passed to the Invoker.

Figure 5C:
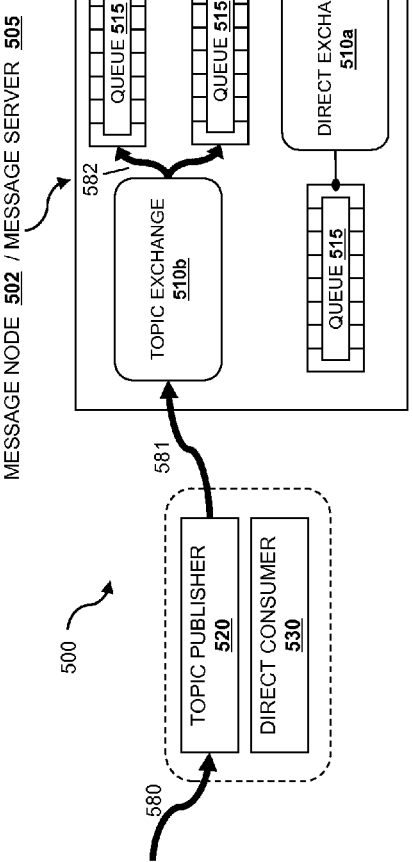
FIG. 5c is a diagram showing how a broadcast message is sent using the message service according to various embodiments.

Turning now to FIG. 5c, one embodiment of the process of sending an RPC broadcast message is shown relative to the elements of the message system 500 as described relative to FIG. 5a. All elements are as described above relative to FIG. 5a unless described otherwise. At step 580, a topic publisher 520 is instantiated. At step 581, the topic publisher 520 sends a message to an exchange 510b. At step 582, the message is dispatched by the exchange 510b. At step 583, the message is fetched by a topic consumer 540 dictated by the routing key (either by topic or by topic and host). At step 584, the message is passed to a Worker associated with the topic consumer 540.

In some embodiments, a response to an RPC broadcast message can be requested. In that case, the process follows the steps outlined relative to FIG. 5b to return a response to the Invoker.

Rule Engine

Because many aspects of the cloud computing system do not allow direct access to the underlying hardware or services, many aspects of the cloud computing system are handled declaratively, through rule-based computing. Rule-based computing organizes statements into a data model that can be used for deduction, rewriting, and other inferential or transformational tasks. The data model can then be used to represent some problem domain and reason about the objects in that domain and the relations between them. In one embodiment, one or more controllers or services have an associated rule processor that performs rule-based deduction, inference, and reasoning.

Rule Engines can be implemented similarly to instruction processors as described relative to FIG. 3, and may be implemented as a sub-module of a instruction processor where needed. In other embodiments, Rule Engines can be implemented as discrete components, for example as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-rule-engine facility. For example, one embodiment uses a language runtime as a rule engine, running as a discrete operating environment, as a process in an active operating environment, or can be run from a low-power embedded processor. In a second embodiment, the rule engine takes the form of a series of interoperating but discrete components, some or all of which may be implemented as software programs. In another embodiment, the rule engine is a discrete component, using a small amount of flash and a low power processor, such as a low-power ARM processor.

Security and Access Control

One subset of rule-based systems is role-based computing systems. A role-based computing system is a system in which identities and resources are managed by aggregating them into "roles" based on job functions, physical location, legal controls, and other criteria. These roles can be used to model organizational structures, manage assets, or organize data. By arranging roles and the associated rules into graphs or hierarchies, these roles can be used to reason about and manage various resources.

In one application, role-based strategies have been used to form a security model called Role-Based Access Control (RBAC). RBAC associates special rules, called "permissions," with roles; each role is granted only the minimum permissions necessary for the performance of the functions associated with that role. Identities are assigned to roles, giving the users and other entities the permissions necessary to accomplish job functions. RBAC has been formalized mathematically by NIST and accepted as a standard by ANSI. American National Standard 359-2004 is the information technology industry consensus standard for RBAC, and is incorporated herein by reference in its entirety.

Because the cloud computing systems are designed to be multi-tenant, it is necessary to include limits and security in the basic architecture of the system. In one preferred embodiment, this is done through rules declaring the existence of users, resources, projects, and groups. Rule-based access controls govern the use and interactions of these logical entities.

In a preferred embodiment, a user is defined as an entity that will act in one or more roles. A user is typically associated with an internal or external entity that will interact with the cloud computing system in some respect. A user can have multiple roles simultaneously. In one embodiment of the system, a user's roles define which API commands that user can perform.

In a preferred embodiment, a resource is defined as some object to which access is restricted. In various embodiments, resources can include network or user access to a virtual machine or virtual device, the ability to use the computational abilities of a device, access to storage, an amount of storage, API access, ability to configure a network, ability to access a network, network bandwidth, network speed, network latency, ability to access or set authentication rules, ability to access or set rules regarding resources, etc. In general, any item which may be restricted or metered is modeled as a resource.

In one embodiment, resources may have quotas associated with them. A quota is a rule limiting the use or access to a resource. A quota can be placed on a per-project level, a per-role level, a per-user level, or a per-group level. In one embodiment, quotas can be applied to the number of volumes which can be created, the total size of all volumes within a project or group, the number of instances which can be launched, both total and per instance type, the number of processor cores which can be allocated, and publicly accessible IP addresses. Other restrictions are also contemplated as described herein.

In a preferred embodiment, a project is defined as a flexible association of users, acting in certain roles, that will define and access various resources. A project is typically defined by an administrative user according to varying demands. There may be templates for certain types of projects, but a project is a logical grouping created for administrative purposes and may or may not bear a necessary relation to anything outside the project. In a preferred embodiment, arbitrary roles can be defined relating to one or more particular projects only.

In a preferred embodiment, a group is defined as a logical association of some other defined entity. There may be groups of users, groups of resources, groups of projects, groups of quotas, or groups which contain multiple different types of defined entities. For example, in one embodiment, a group "development" is defined. The development group may include a group of users with the tag "developers" and a group of virtual machine resources ("developer machines"). These may be connected to a developer-only virtual network ("devnet"). The development group may have a number of ongoing development projects, each with an associated "manager" role. There may be per-user quotas on storage and a group-wide quota on the total monthly bill associated with all development resources.

The applicable set of rules, roles, and quotas is based upon context. In one embodiment, there are global roles, user-specific roles, project-specific roles, and group-specific roles. In one embodiment, a user's actual permissions in a particular project are the intersection of the global roles, user-specific roles, project-specific roles, and group-specific roles associated with that user, as well as any rules associated with project or group resources possibly affected by the user.

In one preferred embodiment, authentication of a user is performed through public/private encryption, with keys used to authenticate particular users, or in some cases, particular resources such as particular machines. A user or machine may have multiple keypairs associated with different roles, projects, groups, or permissions. For example, a different key may be needed for general authentication and for project access. In one such embodiment, a user is identified within the system by the possession and use of one or more cryptographic keys, such as an access and secret key. A user's access key needs to be included in a request, and the request must be signed with the secret key. Upon receipt of API requests, the rules engine verifies the signature and executes commands on behalf of the user.

Some resources, such as virtual machine images, can be shared by many users. Accordingly, it can be impractical or insecure to include private cryptographic information in association with a shared resource. In one embodiment, the system supports providing public keys to resources dynamically. In one exemplary embodiment, a public key, such as an SSH key, is injected into a VM instance before it is booted. This allows a user to login to the instances securely, without sharing private key information and compromising security. Other shared resources that require per-instance authentication are handled similarly.

In one embodiment, a rule processor is also used to attach and evaluate rule-based restrictions on non-user entities within the system. In this embodiment, a "Cloud Security Group" (or just "security group") is a named collection of access rules that apply to one or more non-user entities. Typically these will include network access rules, such as firewall policies, applicable to a resource, but the rules may apply to any resource, project, or group. For example, in one embodiment a security group specifies which incoming network traffic should be delivered to all VM instances in the group, all other incoming traffic being discarded. Users with the appropriate permissions (as defined by their roles) can modify rules for a group. New rules are automatically enforced for all running instances and instances launched from then on.

When launching VM instances, a project or group administrator specifies which security groups it wants the VM to join. If the directive to join the groups has been given by an administrator with sufficient permissions, newly launched VMs will become a member of the specified security groups when they are launched. In one embodiment, an instance is assigned to a "default" group if no groups are specified. In a further embodiment, the default group allows all network traffic from other members of this group and discards traffic from other IP addresses and groups. The rules associated with the default group can be modified by users with roles having the appropriate permissions.

In some embodiments, a security group is similar to a role for a non-user, extending RBAC to projects, groups, and resources. For example, one rule in a security group can stipulate that servers with the "webapp" role must be able to connect to servers with the "database" role on port 3306. In some embodiments, an instance can be launched with membership of multiple security groups—similar to a server with multiple roles. Security groups are not necessarily limited, and can be equally expressive as any other type of RBAC security. In one preferred embodiment, all rules in security groups are ACCEPT rules, making them easily composable.

In one embodiment, each rule in a security group must specify the source of packets to be allowed. This can be specified using CIDR notation (such as 10.22.0.0/16, representing a private subnet in the 10.22 IP space, or 0.0.0.0/0 representing the entire Internet) or another security group. The creation of rules with other security groups specified as sources helps deal with the elastic nature of cloud computing; instances are impermanent and IP addresses frequently change. In this embodiment, security groups can be maintained dynamically without having to adjust actual IP addresses.

In one embodiment, the APIs, RBAC-based authentication system, and various specific roles are used to provide a US eAuthentication-compatible federated authentication system to achieve access controls and limits based on traditional operational roles. In a further embodiment, the implementation of auditing APIs provides the necessary environment to receive a certification under FIPS 199 Moderate classification for a hybrid cloud environment.

Typical implementations of US eAuthentication-compatible systems are structured as a Federated LDAP user store, back-ending to a SAML Policy Controller. The SAML Policy Controller maps access requests or access paths, such as requests to particular URLs, to a Policy Agent in front of an eAuth-secured application. In a preferred embodiment, the application-specific account information is stored either in extended schema on the LDAP server itself, via the use of a translucent LDAP proxy, or in an independent datastore keyed off of the UID provided via SAML assertion.

As described above, in one embodiment API calls are secured via access and secret keys, which are used to sign API calls, along with traditional timestamps to prevent replay attacks. The APIs can be logically grouped into sets that align with the following typical roles:
- Base User
- System Administrator
- Developer
- Network Administrator
- Project Administrator
- Group Administrator
- Cloud Administrator
- Security
- End-user/Third-party User In one currently preferred embodiment, System Administrators and Developers have the same permissions, Project and Group Administrators have the same permissions, and Cloud Administrators and Security have the same permissions. The End-user or Third-party User is optional and external, and may not have access to protected resources, including APIs. Additional granularity of permissions is possible by separating these roles. In various other embodiments, the RBAC security system described above is extended with SAML Token passing. The SAML token is added to the API calls, and the SAML UID is added to the instance metadata, providing end-to-end auditability of ownership and responsibility.

In an embodiment using the roles above, APIs can be grouped according to role. Any authenticated user may:
- Describe Instances
- Describe Images
- Describe Volumes
- Describe Keypairs
- Create Keypair
- Delete Keypair
- Create, Upload, Delete Buckets and Keys System Administrators, Developers, Project Administrators, and Group Administrators may:
- Create, Attach, Delete Volume (Block Store)
- Launch, Reboot, Terminate Instance
- Register/Unregister Machine Image (project-wide)
- Request or Review Audit Scans Project or Group Administrators may:
- Add and remove other users
- Set roles
- Manage groups Network Administrators may:
- Change Machine Image properties (public/private)
- Change Firewall Rules
- Define Cloud Security Groups
- Allocate, Associate, Deassociate Public IP addresses In this embodiment, Cloud Administrators and Security personnel would have all permissions. In particular, access to the audit subsystem would be restricted. Audit queries may spawn long-running processes, consuming resources. Further, detailed system information is a system vulnerability, so proper restriction of audit resources and results would be restricted by role.

In an embodiment as described above, APIs are extended with three additional type declarations, mapping to the "Confidentiality, Integrity, Availability" ("C.I.A.") classifications of FIPS 199. These additional parameters would also apply to creation of block storage volumes and creation of object storage "buckets." C.I.A. classifications on a bucket would be inherited by the keys within the bucket. Establishing declarative semantics for individual API calls allows the cloud environment to seamlessly proxy API calls to external, third-party vendors when the requested C.I.A. levels match.

In one embodiment, a hybrid or multi-vendor cloud uses the VLAN DHCP networking architecture described relative to FIG. 4 and the RBAC controls to manage and secure inter-cluster networking. In this way the hybrid cloud environment provides dedicated, potentially co-located physical hardware with a network interconnect to the project or users' cloud virtual network.

In one embodiment, the interconnect is a bridged VPN connection. In one embodiment, there is a VPN server at each side of the interconnect with a unique shared certificate. A security group is created specifying the access at each end of the bridged connection. In a second embodiment, the interconnect VPN implements audit controls so that the connections between each side of the bridged connection can be queried and controlled. Network discovery protocols (ARP, CDP) can be used to provide information directly, and existing protocols (SNMP location data, DNS LOC records) overloaded to provide audit information.

In the disclosure that follows, the information processing devices as described relative to FIG. 2 and the clusters as described relative to FIG. 3 are used as underlying infrastructure to build and administer various cloud services. Except where noted specifically, either a single information processing device or a cluster can be used interchangeably to implement a single "node," "service," or "controller." Where a plurality of resources are described, such as a plurality of storage nodes or a plurality of compute nodes, the plurality of resources can be implemented as a plurality of information processing devices, as a one-to-one relationship of information processing devices, logical containers, and operating environments, or in an M×N relationship of information processing devices to logical containers and operating environments.

Various aspects of the services implemented in the cloud computing system may be referred to as "virtual machines" or "virtual devices"; as described above, those refer to a particular logical container and operating environment, configured to perform the service described. The term "instance" is sometimes used to refer to a particular virtual machine running inside the cloud computing system. An "instance type" describes the compute, memory and storage capacity of particular VM instances.

Within the architecture described above, various services are provided, and different capabilities can be included through a plug-in architecture. Although specific services and plugins are detailed below, these disclosures are intended to be representative of the services and plugins available for integration across the entire cloud computing system 110.

Figure 6:
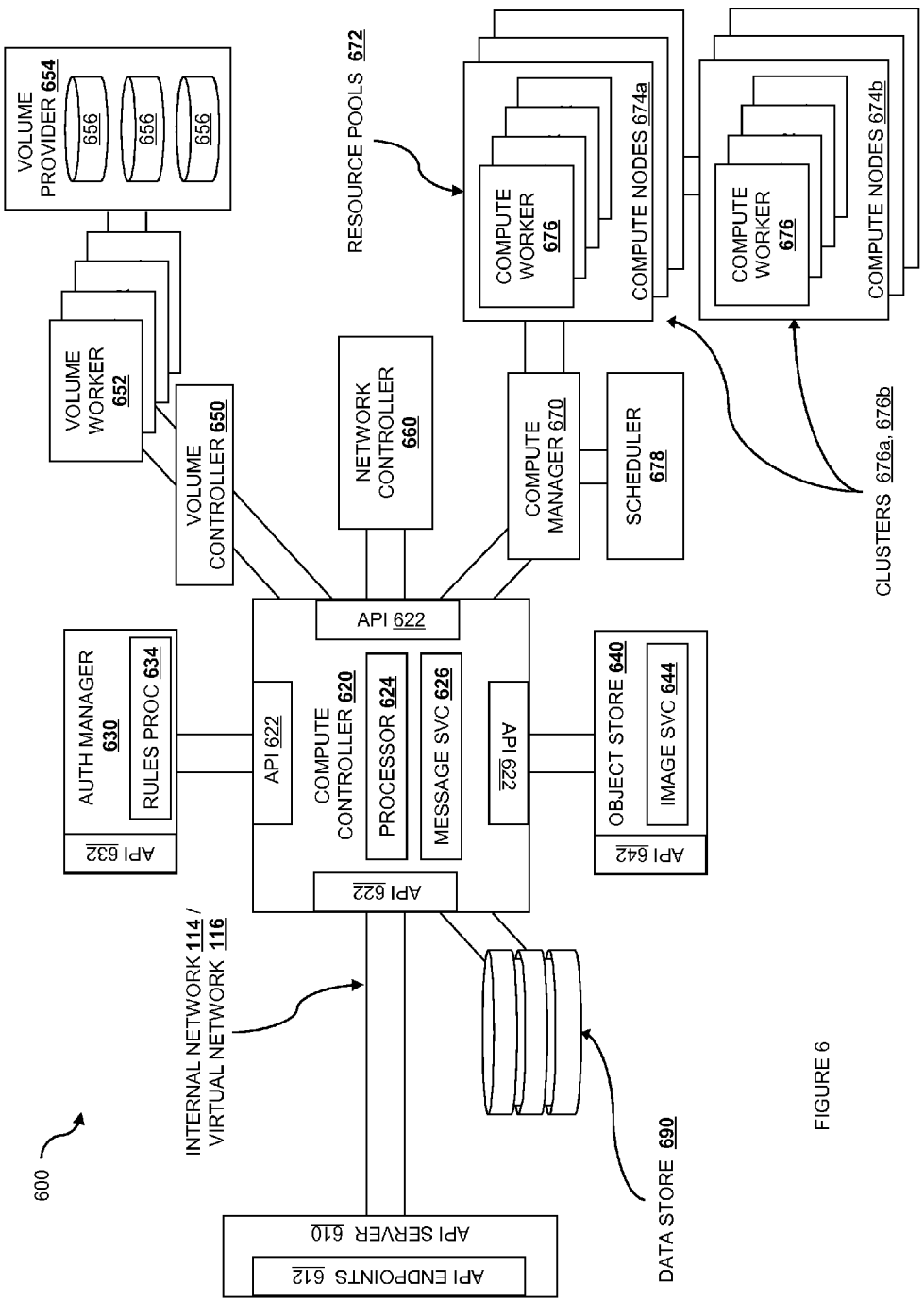
FIG. 6 shows IaaS-style computational cloud service according to various embodiments.

Turning now to FIG. 6, an IaaS-style computational cloud service (a "compute" service) is shown at 600 according to one embodiment. This is one embodiment of a cloud controller 120 with associated cloud service 130 as described relative to FIG. 1. Except as described relative to specific embodiments, the existence of a compute service does not require or prohibit the existence of other portions of the cloud computing system 110 nor does it require or prohibit the existence of other cloud controllers 120 with other respective services 130.

To the extent that some components described relative to the compute service 600 are similar to components of the larger cloud computing system 110, those components may be shared between the cloud computing system 110 and the compute service 600, or they may be completely separate.

Further, to the extend that "controllers," "nodes," "servers," "managers," "VMs," or similar terms are described relative to the compute service 600, those can be understood to comprise any of a single information processing device 210 as described relative to FIG. 2, multiple information processing devices 210, a single VM as described relative to FIG. 2, a group or cluster of VMs or information processing devices as described relative to FIG. 3. These may run on a single machine or a group of machines, but logically work together to provide the described function within the system.

In one embodiment, compute service 600 includes an API Server 610, a Compute Controller 620, an Auth Manager 630, an Object Store 640, a Volume Controller 650, a Network Controller 660, and a Compute Manager 670. These components are coupled by a communications network of the type previously described. In one embodiment, communications between various components are message-oriented, using HTTP or a messaging protocol such as AMQP, ZeroMQ, or STOMP.

Although various components are described as "calling" each other or "sending" data or messages, one embodiment makes the communications or calls between components asynchronous with callbacks that get triggered when responses are received. This allows the system to be architected in a "shared-nothing" fashion. To achieve the shared-nothing property with multiple copies of the same component, compute service 600 further includes distributed data store 690. Global state for compute service 600 is written into this store using atomic transactions when required. Requests for system state are read out of this store. In some embodiments, results are cached within controllers for short periods of time to improve performance. In various embodiments, the distributed data store 690 can be the same as, or share the same implementation as Object Store 640.

In one embodiment, the API server 610 includes external API endpoints 612. In one embodiment, the external API endpoints 612 are provided over an RPC-style system, such as CORBA, DCE/COM, SOAP, or XML-RPC. These follow the calling structure and conventions defined in their respective standards. In another embodiment, the external API endpoints 612 are basic HTTP web services following a REST pattern and identifiable via URL. Requests to read a value from a resource are mapped to HTTP GETs, requests to create resources are mapped to HTTP PUTs, requests to update values associated with a resource are mapped to HTTP POSTs, and requests to delete resources are mapped to HTTP DELETEs. In some embodiments, other REST-style verbs are also available, such as the ones associated with WebDav. In a third embodiment, the API endpoints 612 are provided via internal function calls, IPC, or a shared memory mechanism. Regardless of how the API is presented, the external API endpoints 612 are used to handle authentication, authorization, and basic command and control functions using various API interfaces. In one embodiment, the same functionality is available via multiple APIs, including APIs associated with other cloud computing systems. This enables API compatibility with multiple existing tool sets created for interaction with offerings from other vendors.

The Compute Controller 620 coordinates the interaction of the various parts of the compute service 600. In one embodiment, the various internal services that work together to provide the compute service 600, are internally decoupled by adopting a service-oriented architecture (SOA). The Compute Controller 620 serves as an internal API server, allowing the various internal controllers, managers, and other components to request and consume services from the other components. In one embodiment, all messages pass through the Compute Controller 620. In a second embodiment, the Compute Controller 620 brings up services and advertises service availability, but requests and responses go directly between the components making and serving the request. In a third embodiment, there is a hybrid model in which some services are requested through the Compute Controller 620, but the responses are provided directly from one component to another.

In one embodiment, communication to and from the Compute Controller 620 is mediated via one or more internal API endpoints 622, provided in a similar fashion to those discussed above. The internal API endpoints 622 differ from the external API endpoints 612 in that the internal API endpoints 622 advertise services only available within the overall compute service 600, whereas the external API endpoints 612 advertise services available outside the compute service 600. There may be one or more internal APIs 622 that correspond to external APIs 612, but it is expected that there will be a greater number and variety of internal API calls available from the Compute Controller 620.

In one embodiment, the Compute Controller 620 includes an instruction processor 624 for receiving and processing instructions associated with directing the compute service 600. For example, in one embodiment, responding to an API call involves making a series of coordinated internal API calls to the various services available within the compute service 600, and conditioning later API calls on the outcome or results of earlier API calls. The instruction processor 624 is the component within the Compute Controller 620 responsible for marshalling arguments, calling services, and making conditional decisions to respond appropriately to API calls.

In one embodiment, the instruction processor 624 is implemented as described above relative to FIG. 3, specifically as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor 624, running as a discrete operating environment, as a process in an active operating environment, or can be run from a low-power embedded processor. In a second embodiment, the instruction processor 624 takes the form of a series of interoperating but discrete components, some or all of which may be implemented as software programs. In another embodiment, the instruction processor 624 is a discrete component, using a small amount of flash and a low power processor, such as a low-power ARM processor. In a further embodiment, the instruction processor includes a rule engine as a submodule as described herein.

In one embodiment, the Compute Controller 620 includes a message queue as provided by message service 626. In accordance with the service-oriented architecture described above, the various functions within the compute service 600 are isolated into discrete internal services that communicate with each other by passing data in a well-defined, shared format, or by coordinating an activity between two or more services. In one embodiment, this is done using a message queue as provided by message service 626. The message service 626 brokers the interactions between the various services inside and outside the Compute Service 600.

In one embodiment, the message service 626 is implemented similarly to the message service described relative to FIGS. 5a-5c. The message service 626 may use the message service 140 directly, with a set of unique exchanges, or may use a similarly configured but separate service.

The Auth Manager 630 provides services for authenticating and managing user, account, role, project, group, quota, and security group information for the compute service 600. In a first embodiment, every call is necessarily associated with an authenticated and authorized entity within the system, and so is or can be checked before any action is taken. In another embodiment, internal messages are assumed to be authorized, but all messages originating from outside the service are suspect. In this embodiment, the Auth Manager checks the keys provided associated with each call received over external API endpoints 612 and terminates and/or logs any call that appears to come from an unauthenticated or unauthorized source. In a third embodiment, the Auth Manager 630 is also used for providing resource-specific information such as security groups, but the internal API calls for that information are assumed to be authorized. External calls are still checked for proper authentication and authorization. Other schemes for authentication and authorization can be implemented by flagging certain API calls as needing verification by the Auth Manager 630, and others as needing no verification.

In one embodiment, external communication to and from the Auth Manager 630 is mediated via one or more authentication and authorization API endpoints 632, provided in a similar fashion to those discussed above. The authentication and authorization API endpoints 632 differ from the external API endpoints 612 in that the authentication and authorization API endpoints 632 are only used for managing users, resources, projects, groups, and rules associated with those entities, such as security groups, RBAC roles, etc. In another embodiment, the authentication and authorization API endpoints 632 are provided as a subset of external API endpoints 612.

In one embodiment, the Auth Manager 630 includes a rules processor 634 for processing the rules associated with the different portions of the compute service 600. In one embodiment, this is implemented in a similar fashion to the instruction processor 624 described above.

The Object Store 640 provides redundant, scalable object storage capacity for arbitrary data used by other portions of the compute service 600. At its simplest, the Object Store 640 can be implemented one or more block devices exported over the network. In a second embodiment, the Object Store 640 is implemented as a structured, and possibly distributed data organization system. Examples include relational database systems—both standalone and clustered—as well as non-relational structured data storage systems like MongoDB, Apache Cassandra, or Redis. In a third embodiment, the Object Store 640 is implemented as a redundant, eventually consistent, fully distributed data storage service.

In one embodiment, external communication to and from the Object Store 640 is mediated via one or more object storage API endpoints 642, provided in a similar fashion to those discussed above. In one embodiment, the object storage API endpoints 642 are internal APIs only. In a second embodiment, the Object Store 640 is provided by a separate cloud service 130, so the "internal" API used for compute service 600 is the same as the external API provided by the object storage service itself.

In one embodiment, the Object Store 640 includes an Image Service 644. The Image Service 644 is a lookup and retrieval system for virtual machine images. In one embodiment, various virtual machine images can be associated with a unique project, group, user, or name and stored in the Object Store 640 under an appropriate key. In this fashion multiple different virtual machine image files can be provided and programmatically loaded by the compute service 600.

The Volume Controller 650 coordinates the provision of block devices for use and attachment to virtual machines. In one embodiment, the Volume Controller 650 includes Volume Workers 652. The Volume Workers 652 are implemented as unique virtual machines, processes, or threads of control that interact with one or more backend volume providers 654 to create, update, delete, manage, and attach one or more volumes 656 to a requesting VM.

In a first embodiment, the Volume Controller 650 is implemented using a SAN that provides a sharable, network-exported block device that is available to one or more VMs, using a network block protocol such as iSCSI. In this embodiment, the Volume Workers 652 interact with the SAN to manage and iSCSI storage to manage LVM-based instance volumes, stored on one or more smart disks or independent processing devices that act as volume providers 654 using their embedded storage 656. In a second embodiment, disk volumes 656 are stored in the Object Store 640 as image files under appropriate keys. The Volume Controller 650 interacts with the Object Store 640 to retrieve a disk volume 656 and place it within an appropriate logical container on the same information processing system 240 that contains the requesting VM. An instruction processing module acting in concert with the instruction processor and hypervisor on the information processing system 240 acts as the volume provider 654, managing, mounting, and unmounting the volume 656 on the requesting VM. In a further embodiment, the same volume 656 may be mounted on two or more VMs, and a block-level replication facility may be used to synchronize changes that occur in multiple places. In a third embodiment, the Volume Controller 650 acts as a block-device proxy for the Object Store 640, and directly exports a view of one or more portions of the Object Store 640 as a volume. In this embodiment, the volumes are simply views onto portions of the Object Store 640, and the Volume Workers 654 are part of the internal implementation of the Object Store 640.

In one embodiment, the Network Controller 660 manages the networking resources for VM hosts managed by the compute manager 670. Messages received by Network Controller 660 are interpreted and acted upon to create, update, and manage network resources for compute nodes within the compute service, such as allocating fixed IP addresses, configuring VLANs for projects or groups, or configuring networks for compute nodes.

In one embodiment, the Network Controller 660 is implemented similarly to the network controller described relative to FIGS. 4a and 4b. The network controller 660 may use a shared cloud controller directly, with a set of unique addresses, identifiers, and routing rules, or may use a similarly configured but separate service.

In one embodiment, the Compute Manager 670 manages computing instances for use by API users using the compute service 600. In one embodiment, the Compute Manager 670 is coupled to a plurality of resource pools 672, each of which includes one or more compute nodes 674. Each compute node 674 is a virtual machine management system as described relative to FIG. 3 and includes a compute worker 676, a module working in conjunction with the hypervisor and instruction processor to create, administer, and destroy multiple user- or system-defined logical containers and operating environments—VMs—according to requests received through the API. In various embodiments, the pools of compute nodes may be organized into clusters, such as clusters 676a and 676b. In one embodiment, each resource pool 672 is physically located in one or more data centers in one or more different locations. In another embodiment, resource pools have different physical or software resources, such as different available hardware, higher-throughput network connections, or lower latency to a particular location.

In one embodiment, the Compute Manager 670 allocates VM images to particular compute nodes 674 via a Scheduler 678. The Scheduler 678 is a matching service; requests for the creation of new VM instances come in and the most applicable Compute nodes 674 are selected from the pool of potential candidates. In one embodiment, the Scheduler 678 selects a compute node 674 using a random algorithm. Because the node is chosen randomly, the load on any particular node tends to be non-coupled and the load across all resource pools tends to stay relatively even.

In a second embodiment, a smart scheduler 678 is used. A smart scheduler analyzes the capabilities associated with a particular resource pool 672 and its component services to make informed decisions on where a new instance should be created. When making this decision it consults not only all the Compute nodes across the resource pools 672 until the ideal host is found.

In a third embodiment, a distributed scheduler 678 is used. A distributed scheduler is designed to coordinate the creation of instances across multiple compute services 600. Not only does the distributed scheduler 678 analyze the capabilities associated with the resource pools 672 available to the current compute service 600, it also recursively consults the schedulers of any linked compute services until the ideal host is found.

In one embodiment, either the smart scheduler or the distributed scheduler is implemented using a rules engine 679 (not shown) and a series of associated rules regarding costs and weights associated with desired compute node characteristics. When deciding where to place an Instance, rules engine 679 compares a Weighted Cost for each node. In one embodiment, the Weighting is just the sum of the total Costs. In a second embodiment, a Weighting is calculated using a exponential or polynomial algorithm. In the simplest embodiment, costs are nothing more than integers along a fixed scale, although costs can also be represented by floating point numbers, vectors, or matrices. Costs are computed by looking at the various Capabilities of the available node relative to the specifications of the Instance being requested. The costs are calculated so that a "good" match has lower cost than a "bad" match, where the relative goodness of a match is determined by how closely the available resources match the requested specifications.

In one embodiment, specifications can be hierarchical, and can include both hard and soft constraints. A hard constraint is a constraint is a constraint that cannot be violated and have an acceptable response. This can be implemented by having hard constraints be modeled as infinite-cost requirements. A soft constraint is a constraint that is preferable, but not required. Different soft constraints can have different weights, so that fulfilling one soft constraint may be more cost-effective than another. Further, constraints can take on a range of values, where a good match can be found where the available resource is close, but not identical, to the requested specification. Constraints may also be conditional, such that constraint A is a hard constraint or high-cost constraint if Constraint B is also fulfilled, but can be low-cost if Constraint C is fulfilled.

As implemented in one embodiment, the constraints are implemented as a series of rules with associated cost functions. These rules can be abstract, such as preferring nodes that don't already have an existing instance from the same project or group. Other constraints (hard or soft), may include: a node with available GPU hardware; a node with an available network connection over 100 Mbps; a node that can run Windows instances; a node in a particular geographic location, etc.

When evaluating the cost to place a VM instance on a particular node, the constraints are computed to select the group of possible nodes, and then a weight is computed for each available node and for each requested instance. This allows large requests to have dynamic weighting; if 1000 instances are requested, the consumed resources on each node are "virtually" depleted so the Cost can change accordingly.

Figure 7:
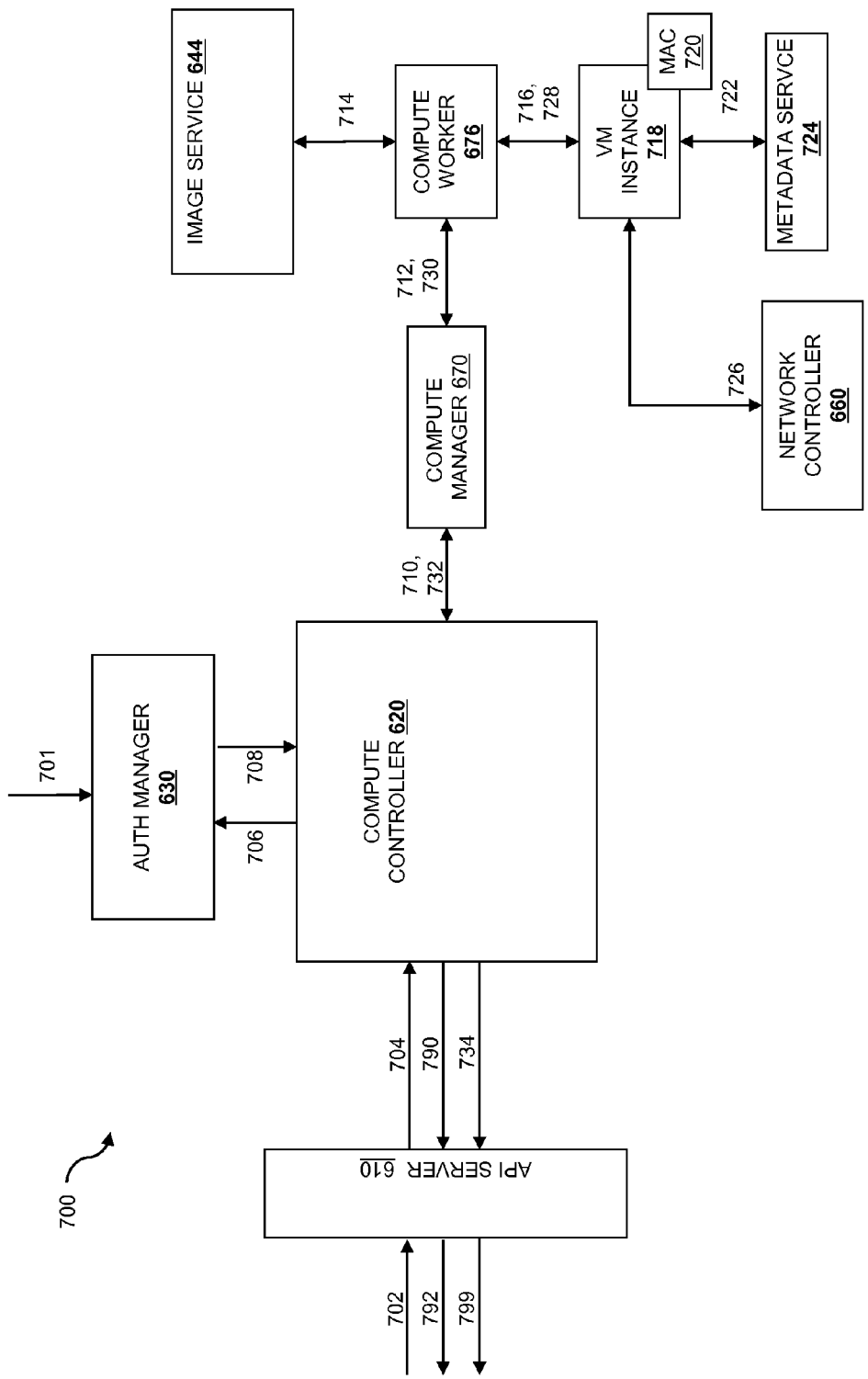
FIG. 7 is a diagram showing the process of instantiating, launching and authenticating a VM instance according to various embodiments.

Turning now to FIG. 7, a diagram showing one embodiment of the process of instantiating, launching and authenticating a VM instance is shown as diagram 700. In one embodiment, this corresponds to steps 458 and/or 459 in FIG. 4b. Although the implementation of the image instantiating and launching process will be shown in a manner consistent with the embodiment of the compute service 600 as shown relative to FIG. 6, the process is not limited to the specific functions or elements shown in FIG. 6. For clarity of explanation, internal details not relevant to diagram 700 have been removed from the diagram relative to FIG. 6. Further, while some requests and responses are shown in terms of direct component-to-component messages, in at least one embodiment the messages are sent via a message service, such as message service 626 as described relative to FIG. 6.

Beginning at time 701, Auth Manager 630 receives a request to setup default permissions for controlling identity-based authentication. In one embodiment, these permissions are generic to all identities. In another embodiment, the permissions apply to a single identity, such as a single MAC address. In another embodiment, the permissions apply to a range of identities, such as a range of MAC addresses. In one embodiment, the permissions define the type of access that a particular identity has to a certain resource. For example, the permissions may state that MAC address 00-B0-D0-86-BB-F7 has read/write access to a configuration resource. In another embodiment, the permissions comprise a whitelist of identities that can access the resource. In another embodiment, the permissions comprise a blacklist of identities that are not permitted to access the resource. In one embodiment, the request to setup the default permissions is received via an API. In another embodiment, the request is received through a configuration tool such as a user interface.

In another embodiment, the permissions functionality is implemented according to the Role-Based Access Control (RBAC) security model discussed previously. In such an embodiment, an identity or group of identities are assigned a role, and the role is granted the minimum permissions necessary to perform the functions of the role. For example, a VM instance could be assigned the role of "Consumer." An owner of a particular resource may want VM's with the consumer role to be able to read from, but not write to the resource. The owner could configure the permissions for the "Consumer" role to allow read-only access, and thus avoid having to configure individual entries for each identity. This is useful since often the resource owner will not be aware of all identities that will ultimately access the resource.

At time 702, the API Server 610 receives a request to create and run a VM instance with the appropriate arguments. In one embodiment, this is done by using a command-line tool that issues arguments to the API server 610. In a second embodiment, this is done by sending a message to the API Server 610. In one embodiment, the API to create and run the VM instance includes arguments specifying a VM type, a VM image, and control arguments. In one embodiment, the request also includes requester information. In another embodiment, the request is signed and/or encrypted for security and privacy.

At time 704, API server 610 accepts the message, examines it for API compliance, and sends a message to Compute Controller 620, including the information needed to service the request. In the depicted embodiment, the information includes a user identification that identifies the requesting user or account. In one embodiment, the user identification is implicitly included, such as via a signing and/or encrypting key or certificate. In another embodiment, the user identification is explicitly included in the form of user credentials such as a username and password. In another embodiment, the user identification is derived from other information, such as the address from which the request was received. In another embodiment, no user identification is included in the message. In such an embodiment, a default user identification may be substituted.

At time 706, the Compute Controller 620 sends a message to Auth Manager 630 to authenticate and authorize the request. The Auth Manager 630 performs a check to see if the request is allowable. In one embodiment, this involves checking a permissions database to determine whether the user identified by the user identification has permission to perform the requested operation. For example, in such an embodiment, the permissions database may allow user A to start VMs of a first type but not a second type, or may allow the user to only start VM images that it owns. In another embodiment, the check includes only determining if the user identified by the user identification is an authorized user on the system. Also at time 706, the Compute Controller 620 performs a lookup to retrieve any default permissions the user has configured for controlling identity-based authentication (for example, as described above with reference to time 701).

At time 708, Auth Manager 630 sends back a response to Compute Controller 620 indicating whether the request is allowable. The response from the Auth Manager 630 to the Computer Controller 620 also includes any default permissions the user has configured for identity-based virtual machines. If the request is allowable, a message is sent to the Compute Manager 670 to instantiate the requested virtual machine at time 710. At time 712, the Compute Controller 620 selects a Compute Worker 676 and instructs it to instantiate the requested VM image. At time 714, the Compute Worker 676 loads the requested VM image from the Image Service 644.

At time 716, the Compute Worker 676 uses the available virtualization infrastructure as described relative to FIG. 2 to instantiate VM instance 718 from the VM image loaded at time 714. Also at time 716, the Compute Worker assigns the VM instance 718 a MAC address 720 (or link-local address). In one embodiment, the MAC address 720 is selected from a pool of MAC addresses. In another embodiment, the MAC address 720 is specifically configured for that VM instance, such as in the message from the Compute Manager 670. In another embodiment, the MAC address 720 is replaced with another immutable value that can be used to convey the identity of VM instance 718. Such values include, but are not limited to, an IP address, an IP port, a signature value, a unique identifier, or any other value known in the art. In one embodiment, the immutable value is a hash value computed from the VM image used to instantiate the VM instance 718, such as, for example, an SHA-1, SHA-2, or SHA-3 hash. In one such embodiment, the hash is computed at instantiation time and then assigned as an immutable attribute of the VM instance 718 by the Compute Worker. In another embodiment, the compute node on which the VM instance 718 is instantiated serves as the identity of the VM instance 718. In another embodiment, the instructions performed by the VM instance 718 themselves comprise the identity of the VM instance. For example, if the VM instance consisted of a set of executable code instructions, these code instructions are an immutable piece of information about the VM instance, as they actually define what actions the VM instance performs. Changing them would result in a change to the functionality of the VM instance. Accordingly, in some embodiments, the identity value may be computed based on an examination of the functionality or instructions executed by the VM instance 718.

In another embodiment, the VM instance 718 is assigned multiple identities at instantiation. For example, the VM instance 718 may be assigned a MAC address and an SHA-1 hash value of its image. In one such embodiment, the VM instance 718 provides the multiple identities as a combined value in order to authenticate to other components in the system. In another embodiment, the VM instance 718 provides only a single identity value to each component in the cloud computing system to which it needs to authenticate. In such an embodiment, each component would determine which identity value it required for authentication. For example, a network controller may require authentication via a MAC address, while a metadata service may require authentication via a hash. In another embodiment, the APIs between the various components define which authentication methods are appropriate. In another embodiment, the components accept multiple types of identities for authentication. In still another embodiment, the components may allow authentication with one type of identity for certain types of data, and other types for another. For example, network configuration information may require MAC address authentication, while information relating to a particular virtual machine image may require has authentication.

At time 722, the newly instantiated VM instance 718 begins the process of obtaining its initial configuration by interacting with Metadata Service 724 and Network Controller 660. Metadata Service 724 is a service that provides general configuration information to the newly instantiated VM instance 718. For example, the Metadata Service 724 may supply the VM instance 718 with contact information (e.g. network addresses) for various other services or VMs with which it needs to interact, configuration parameters that alter the mode or mechanism of operation of the VM instance 718, supplemental instructions to be executed on startup by the VM instance 718, or any other necessary configuration information. The Metadata Service 724 applies permissions configured by the user at step 701 to allow or deny the VM instance 718 access to its resources based on the assigned MAC address 720. For example, depending on the permissions for its assigned MAC address 720, the VM instance 718 may be allowed to perform non-destructive actions like listing available resources, but may be restricted from taking affirmative actions such as spawning new VM instances. In embodiments that do not use a MAC address to denote the VM instance 718's identity, the Metadata Service 724 will be altered to apply the permissions according the chosen identity mechanism. In one embodiment, the Metadata Service 724 applies the permissions by interacting with the Auth Manager 630, which determines whether to permit or deny access to the Metadata Service 630 based on the MAC address.

In one embodiment, the VM instance 718 authenticates to the Metadata Service 724 via an identity as described above. The Metadata Service 724 responds with supplement, "possession-based" authentication information such as a username and password, token, or other mechanism. In such a two-stage authentication scheme, the identity is used only to prove that the VM instance 718 is entitled to possess the supplemental security credentials. Once the VM instance 718 initially proves its identity to the Metadata Service 724, it can be issued the possession-based credentials and use those credentials for subsequent authentication to other resources.

At time 726, VM instance 718 interacts with Network Controller 660 to get a proper VLAN and IP address as described in steps 451-457 relative to FIG. 4. The VM instance 718 again provides its MAC address 720 in order to authenticate itself to the Network Controller 660 and obtain the VLAN and IP address. In embodiments that do not use a MAC address to denote the VM instance 718's identity, the Network Controller 660 will be altered to apply the permissions according the chosen identity mechanism. In one embodiment, the Network Controller 660 applies the permissions by interacting with the Auth Manager 630, which determines whether to permit or deny access to the Metadata Service 630 based on the MAC address.

At time 728, the VM instance 718 and Compute Worker 676 interact to determine whether the VM instance has been successfully instantiated. In one embodiment, the VM instance 718 sends the Compute Worker a message indicating successful instantiation. In another embodiment, the Compute Worker 676 monitors the VM instance 718 to determine its status. At time 730, an indication of the result of the instantiation request is sent by the Compute Worker to the Compute Manager 670. At time 732, the Compute Manager sends the result to the Compute Controller 620. At time 734, a message is sent back to the API Server 610 with the result. At time 799, the API-specified response to the original command is provided from the API Server 610 back to the originally requesting entity. If at any time a requested operation cannot be performed, then an error is returned to the API Server at time 790 and the API-specified response to the original command is provided from the API server at time 792. For example, an error at time 708, if a VLAN cannot be created or an IP allocated at time 726, if an image cannot be found or transferred at time 714, etc.

Although the above embodiment describes a VM instance authenticating via its identity to a network controller and a metadata service, the present disclosure is not limited to such an application. Authentication between different components in a cloud computing system can be performed using an identity-based approach. For example, such an approach is useful in a multi-vendor cloud environment, where each component may be provided by a different party. In order to ensure cooperation and segregation of resources in such an environment, it is important for the components to be able to reliably identify each other.

For example, in one embodiment, identity-based authentication is used by a first hypervisor to determine whether to service the request of a second hypervisor. Consider a configuration where each hypervisor has an identity, and the first hypervisor receives a request from the second hypervisor to spawn a VM instance to perform a certain task. For example, the second hypervisor is at capacity and requests the first hypervisor to process a work unit it is unable to process in a load sharing process. In such a configuration, the first hypervisor would examine the identity of the second hypervisor to determine if it was willing to process work units from the second hypervisor. For example, the first hypervisor might determine whether the second hypervisor's identity is in a group of identities for which the owner has paid for the right to use the first hypervisor's spare resources. If so, it would process the request. If not, it would deny.

In another embodiment, communications and requests between individual VMs can be authenticated by identity. A first VM instance can determine whether or not to trust information from a second VM instance based on the identity value of the second VM instance. If it receives information from an untrusted identity, it can discard it. In another embodiment, a VM instance authenticates to volume using an identity. In such an embodiment, the information returned from the volume is specific to the identity of the VM instance. In another embodiment, the volume allows the VM instance to access a portion of its storage dedicated specifically to the VM instance's identity (e.g. a home directory).

In another embodiment, a compute worker authenticates to the image service via an identity (e.g. a MAC address) in order to retrieve an VM image to instantiate. Such a scheme could be implemented in order to enforce security and allow only compute workers for a certain vendor or entity instantiate VM instances belonging to that entity in a multi-vendor cloud computing environment. In another embodiment, compute controllers from different vendors or entities in a multi-vendor environment authenticate to each other via identities in order to share usage information, distribute work units, and/or distribute and provide resources between each other. In another embodiment, a compute worker authenticates requests from compute controllers based on the identity of the compute controller, again to allow for selective work unit servicing in a multi-vendor cloud computing environment.

In one embodiment, all identity-based authentication is performed by the Auth Manager 630, which is responsible for storing permissions for all identities, role assignments, and all other configuration related to identity-based authentication. In another embodiment, identity-based authentication is performed by a plurality of Auth Managers, each one containing a replicated copy of the identity and permission data. In another embodiment, the individual components, such as the Network Controller and Metadata Service, perform the identity-based authentication themselves and store the necessary identity and permission data. In another embodiment, each vendor within a multi-vendor cloud computing system has its own Auth Manager 630 to perform identity-based authentication. In another embodiment, identities and permissions are selectively synchronized between Auth Managers belonging to different vendors.

Figure 8:
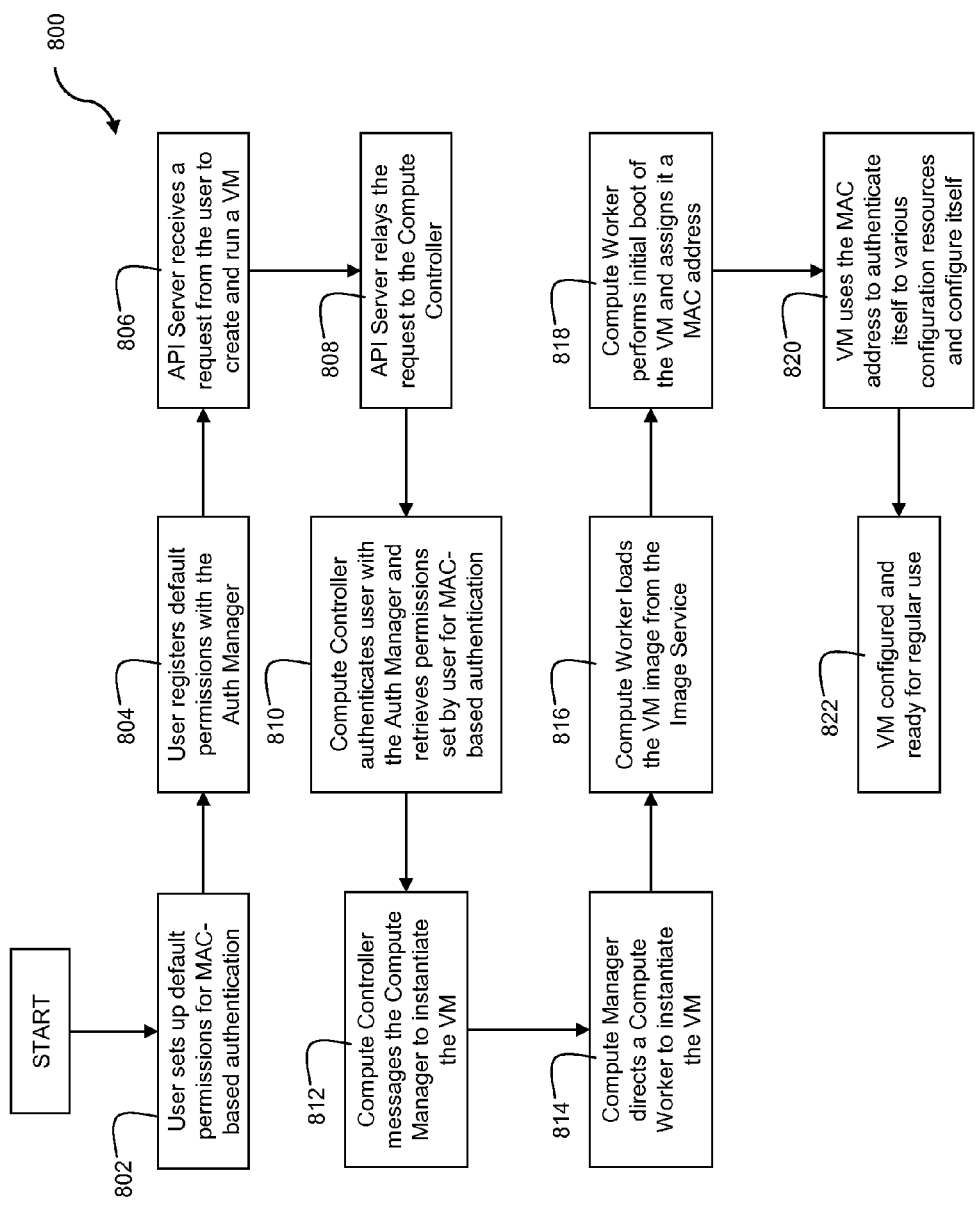
FIG. 8 is a flowchart showing a method of instantiating, launching and authenticating a VM instance according to various embodiments.

Turning now to FIG. 8, a flowchart showing one embodiment of a method 800 according to various aspects of the present disclosure. At step 802, the user sets up default permissions for MAC-based authentication. As discussed previously, other mechanisms for establishing identity besides MAC address can be used without deviating from the teachings of the present disclosure. At step 804, the user registers these default permissions with the Auth Manager.

At step 806, the API Server receives a request from the user to create and run a VM. At step 808, the API Server relays the request to the Compute Controller. At step 810, the Compute Controller authenticates user with the Auth Manager and retrieves permissions set by user for MAC-based authentication. At step 812, the Computer Controller messages the Compute Manager to instantiate the VM. At step 814, the Compute Manager directs a Compute Worker to instantiate the VM. At step 816, the Compute Worker loads the VM image from the Image Service. At step 818, Compute Worker performs initial boot of the VM and assigns it a MAC address. At step 820, the VM uses the MAC address to authenticate itself to various configuration resources and configure itself. At step 822, the VM is configured and ready for regular use. Note that in other embodiments, various steps of method 800 may rearranged, combined or omitted without deviating from the teachings of the present disclosure.

One advantage of identity-based authentication is that it allows interaction between interaction between a cloud computing system and VMs based upon APIs. Identity-authenticated VMs can expose the public API on the private VLAN network, and they may include extensions or early-stage APIs that are not otherwise available, or other interactive setups. Making more of the VM instantiation process API-based increases the flexibility and capability.

Another advantage of identity-based authentication is increased security and privacy for users of the cloud computing system. MAC addresses and other identity attributes are not easily spoofed, unlike traditional possession-based authenticators like user names and passwords. In addition, identity-based authentication allows the user to avoid coding sensitive information (such as login credentials) into a VM image that may be viewable by other users or system administrators.

Another advantage of identity-based authentication is it addresses the difficult problem of authentication during initial setup of a virtual machine instance in a cloud computing system. Identity-based authentication removes the need for storing user credentials or encryption keys with a virtual machine image for authentication. With identity based authentication, the virtual machine instance is provided with a unique, immutable value that it can use to authenticate to resources on startup.

Another advantage of identity-based authentication is the ability to provide secure authentication and authorization of components within a multi-vendor cloud computing system. In such a configuration, resources owned by the various vendors are often selectively shared based on who has issued the request. Identity-based authentication can be used in such a scenario to only service requests for service from vendors that are authorized to receive such a service. For example, a vendor might only provide a service to other vendors or users within a cloud computing system if the users or vendors have paid a fee. Identity based authentication can be used to register the authorized identities to receive the service based on receipt of payment.

Even though illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cloud computing system, the system comprising
a resource having configuration information;
a virtual machine instance operably coupled to the resource, wherein an immutable value denotes an identity of the virtual machine instance, and wherein the virtual machine instance uses the immutable value to authenticate to the resource during startup, and the configuration information is different from authentication credentials; and
an authentication manager that controls, based on the immutable value, access by the virtual machine instance to the resource, wherein the configuration information alters an operation of the virtual machine instance.

2. The cloud computing system of claim 1, wherein the virtual machine instance is assigned a second identity at instantiation, and wherein the virtual machine instance provides the first and second identities as a combined value for authentication to the authentication manager.

3. The cloud computing system of claim 1, wherein the resource includes network access to a second virtual machine.

4. The cloud computing system of claim 1, wherein the resource includes network access to a virtual device.

5. The cloud computing system of claim 1, wherein the resource includes access to a storage device.

6. The cloud computing system of claim 1, wherein the immutable value is based on instructions performed by the virtual machine instance.

7. The cloud computing system of claim 6, wherein the immutable value is a hash value computed based on the instructions performed by the virtual machine instance.

8. The cloud computing system of claim 1, further comprising:
a compute worker that assigns the immutable value to the virtual machine instance.

9. The cloud computing system of claim 8, wherein the immutable value is a hash value computed from a virtual machine image used to instantiate the virtual machine instance.

10. The cloud computing system of claim 9, wherein the hash value is computed by using SHA-1, SHA-2, or SHA-3.

11. The cloud computing system of claim 9, wherein the configuration information is stored separate from the virtual machine instance.

12. A method for controlling access to a resource, the method comprising:
receiving a request from a virtual machine instance for access to a resource, the request including an immutable value that denotes the identity of the virtual machine instance, and the resource including configuration information that alters an operation of the virtual machine instance; and
determining, based on the immutable value, whether to grant the virtual machine instance access to the resource, wherein the virtual machine instance uses the immutable value to authenticate to the resource during startup, and the configuration information is different from authentication credentials.

13. The method of claim 12, wherein the immutable value is a hash value computed from a virtual machine image used to instantiate the virtual machine instance.

14. The method of claim 13, wherein the hash value is computed by using SHA-1, SHA-2, or SHA-3.

15. The method of claim 13, wherein the hash value is computed at instantiation time of the virtual machine instance.

16. The method of claim 12, wherein the immutable value is based on instructions performed by the virtual machine instance.

17. The method of claim 16, wherein the immutable value is a hash value computed based on the instructions performed by the virtual machine instance.

18. The method of claim 12, wherein the resource includes network access to a second virtual machine.

19. The method of claim 12, wherein the resource includes network access to a virtual device.

20. The method of claim 12, further comprising:
assigning a group of identities to a role, the group of identities including the virtual machine instance, and the role being granted minimum permissions necessary to perform functions of the role; and
receiving user input from a user, wherein the user input configures the permissions for the role.

* * * * *